United States Patent
Maeda

(10) Patent No.: US 9,979,979 B2
(45) Date of Patent: May 22, 2018

(54) IMAGE CODING APPARATUS, METHOD FOR CODING IMAGE, PROGRAM THEREFOR, IMAGE DECODING APPARATUS, METHOD FOR DECODING IMAGE, AND PROGRAM THEREFOR

(71) Applicant: CANON KABUSHIKI KAISHA, Tokyo (JP)

(72) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/629,475

(22) Filed: Jun. 21, 2017

(65) Prior Publication Data

US 2017/0289563 A1     Oct. 5, 2017

Related U.S. Application Data

(63) Continuation of application No. 15/014,394, filed on Feb. 3, 2016, now Pat. No. 9,716,895, which is a
(Continued)

(30) Foreign Application Priority Data

Mar. 9, 2011   (JP) ................................. 2011-051267

(51) Int. Cl.
    *G06K 9/00*           (2006.01)
    *H04N 19/50*         (2014.01)
    (Continued)

(52) U.S. Cl.
    CPC ........... *H04N 19/50* (2014.11); *H04N 19/124* (2014.11); *H04N 19/167* (2014.11);
    (Continued)

(58) Field of Classification Search
None
See application file for complete search history.

(56) References Cited

U.S. PATENT DOCUMENTS

| | | | | |
|---|---|---|---|---|
| 2002/0118757 A1* | 8/2002 | Hirase | .................... | H04N 19/60 375/240.18 |
| 2006/0008006 A1* | 1/2006 | Cha | ....................... | H04N 19/176 375/240.16 |
| 2006/0239565 A1* | 10/2006 | Park | ........................ | H04N 19/63 382/232 |
| 2007/0237241 A1* | 10/2007 | Ha | ........................ | H04N 19/176 375/240.27 |

(Continued)

FOREIGN PATENT DOCUMENTS

EP          2608540 A2      6/2013

OTHER PUBLICATIONS

Algorithm proposal (BT Labs), Cosmic, AVC Meeting; Dec. 18, 1991-Dec. 21, 1991; CCITT SGXV, Working Party XV/1, Experts Group for ATM Video Coding, Document AVC-118, Dec. 18, 1991, 56 pages.

(Continued)

*Primary Examiner* — Hadi Akhavannik
(74) *Attorney, Agent, or Firm* — Canon U.S.A., Inc. IP Division

(57) ABSTRACT

An image processing apparatus includes a division unit configured to divide an input image into a plurality of subblocks subjected to quantization control a subblock quantization parameter calculation unit configured to calculate a quantization parameter of each of the subblocks, a basic block quantization parameter calculation unit configured to set a basic block including at least two subblocks and to calculate a quantization parameter of the basic block, a difference value calculation unit configured to calculate a difference value between the quantization parameter of the basic block and the quantization parameter of each subblock included in the basic block, and a difference value coding unit configured to code the difference value.

18 Claims, 20 Drawing Sheets

Related U.S. Application Data continuation of application No. 14/003,776, filed as application No. PCT/JP2012/001319 on Feb. 27, 2012, now Pat. No. 9,277,221.

(51) Int. Cl.

| | |
|---|---|
| *H04N 19/176* | (2014.01) |
| *H04N 19/61* | (2014.01) |
| *H04N 19/91* | (2014.01) |
| *H04N 19/124* | (2014.01) |
| *H04N 19/436* | (2014.01) |
| *H04N 19/167* | (2014.01) |
| *H04N 19/463* | (2014.01) |

(52) U.S. Cl.
CPC ......... *H04N 19/176* (2014.11); *H04N 19/436* (2014.11); *H04N 19/463* (2014.11); *H04N 19/61* (2014.11); *H04N 19/91* (2014.11)

(56) References Cited

U.S. PATENT DOCUMENTS

| | | | |
|---|---|---|---|
| 2008/0117977 A1* | 5/2008 | Lee ........................ | H04N 19/56 375/240.16 |
| 2009/0232217 A1* | 9/2009 | Lee ..................... | H04N 19/197 375/240.16 |
| 2011/0033127 A1* | 2/2011 | Rasmusson ............... | G06T 9/00 382/238 |

OTHER PUBLICATIONS

Kazushi Sato, Proposal on Large Block Structure and Quantization, Joint Collaborative Team on Video Coding (JCT-VC) of ITU-T SG16 WP3 and ISO/IEC JTC1/SC29/WG11, 3rd Meeting, Guangzhou, CN, Oct. 7-15, 2010, Document No. JCTVC-C167, Saved Feb. 15, 2011, pp. 1-8.

\* cited by examiner

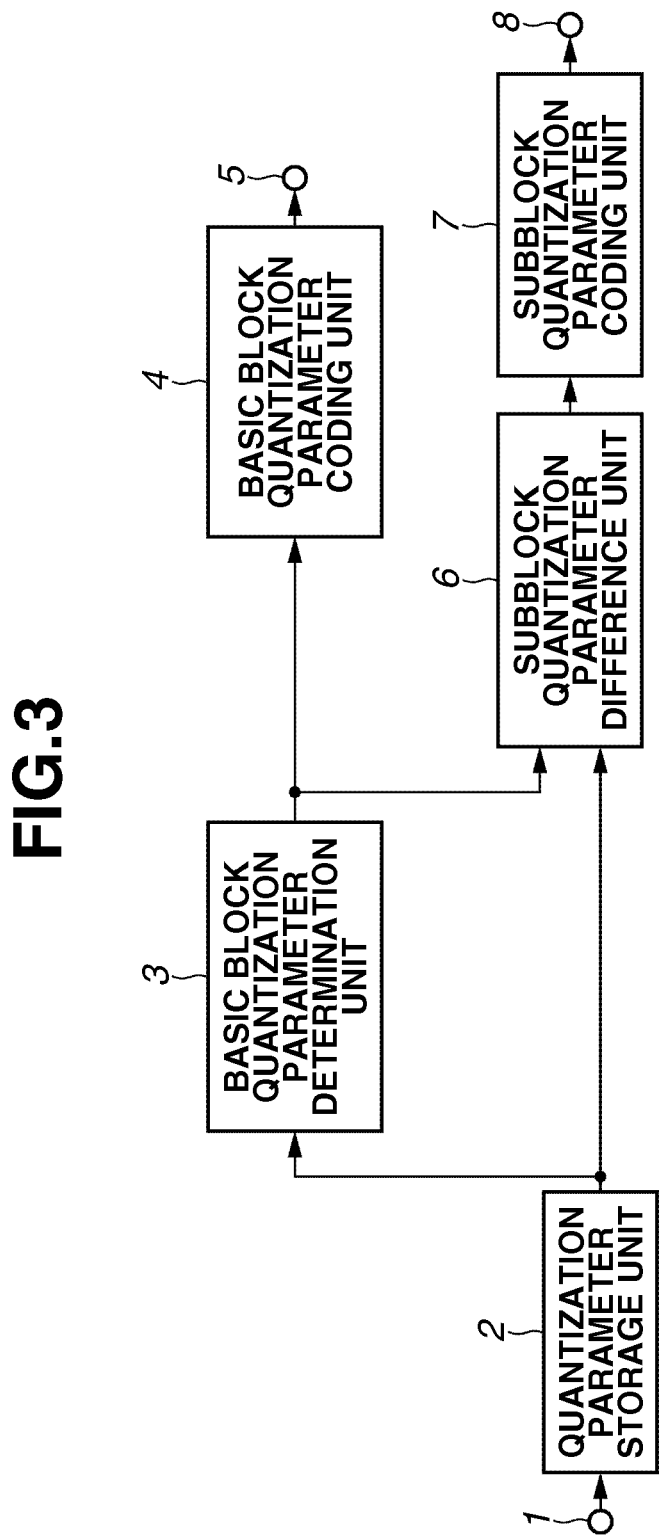

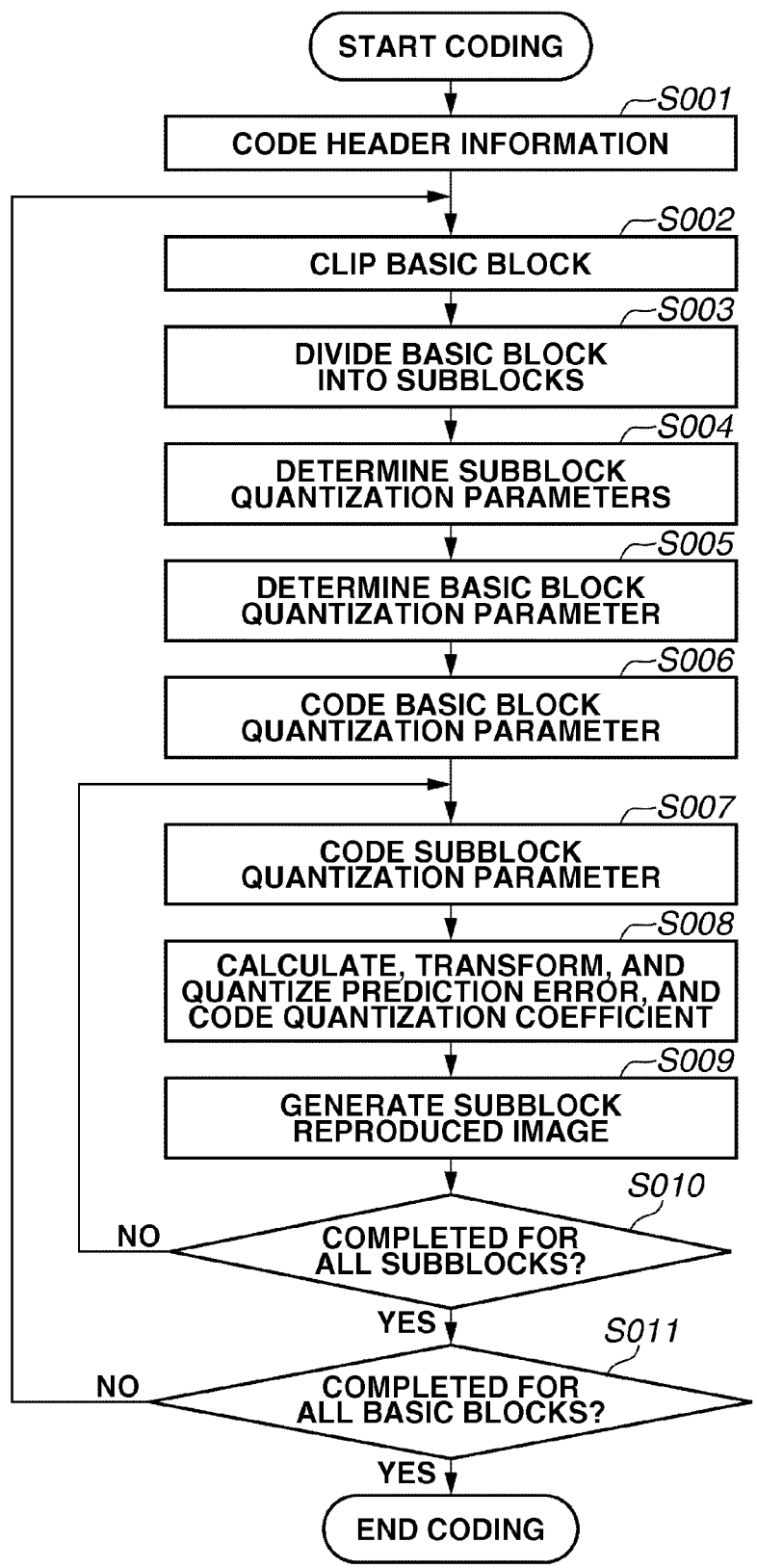

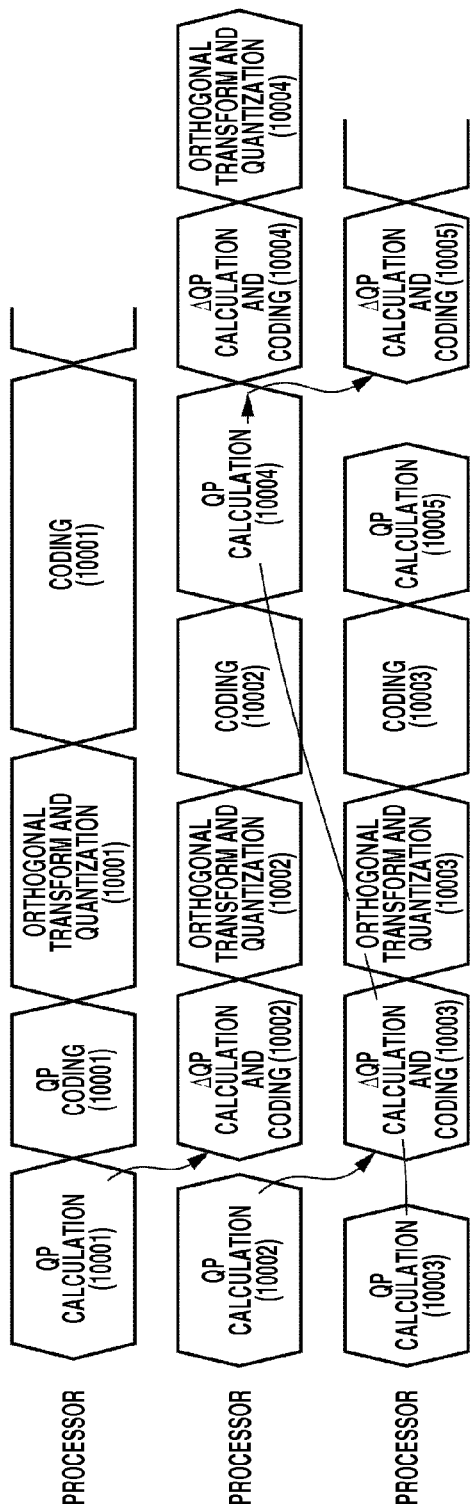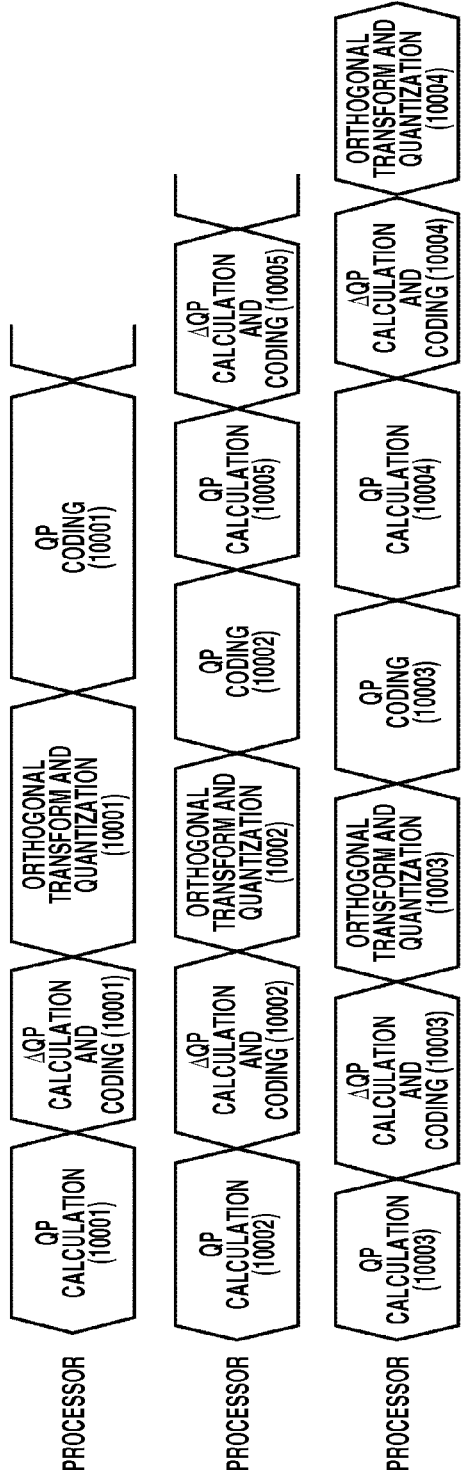

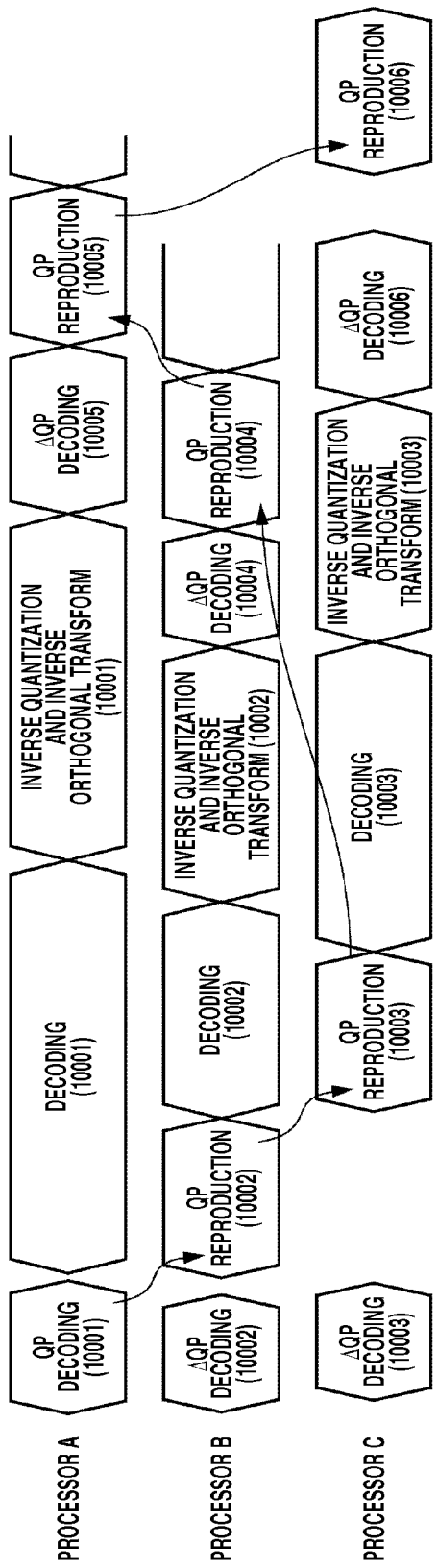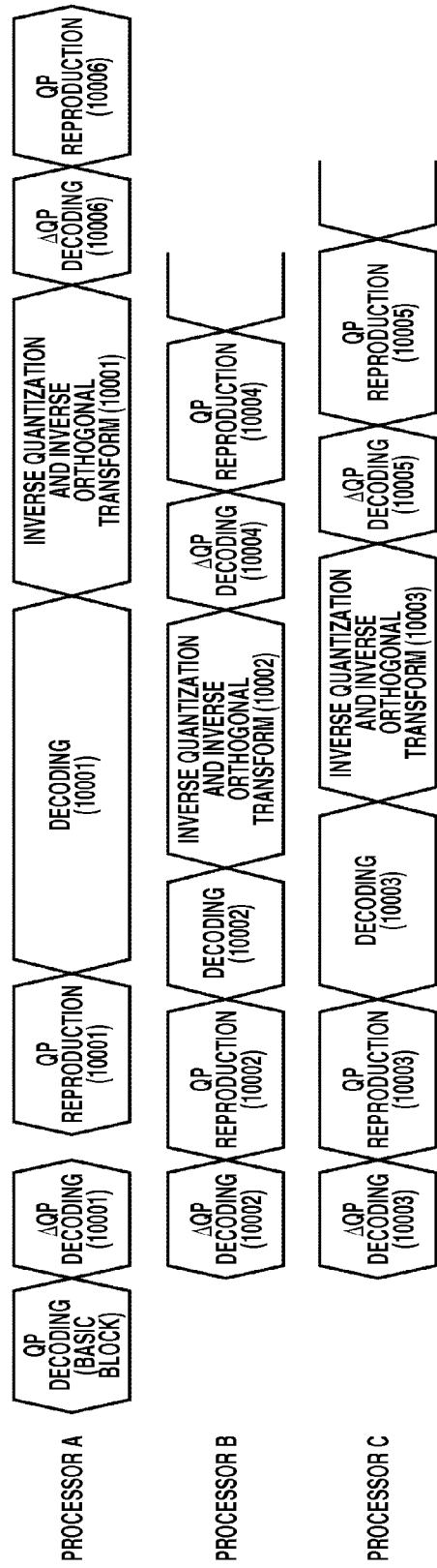

IMAGE CODING APPARATUS, METHOD FOR CODING IMAGE, PROGRAM THEREFOR, IMAGE DECODING APPARATUS, METHOD FOR DECODING IMAGE, AND PROGRAM THEREFOR

RELATED APPLICATIONS

This application is a continuation of U.S. patent application Ser. No. 15/014,394 filed on Feb. 3, 2016, which is a continuation of Ser. No. 14/003,776 filed on Sep. 6, 2013 as a National Stage application pursuant to 35 U.S.C. 371 (which issued as U.S. Pat. No. 9,277,221), which claims the benefit of PCT/JP2012/001319 filed Feb. 27, 2012, and Japanese Patent Application No. 2011-051267 filed Mar. 9, 2011. The above applications are hereby incorporated by reference herein in their entirety.

TECHNICAL FIELD

The present invention relates to an image coding apparatus, a method for coding an image, a program therefor, an image decoding apparatus, a method for decoding an image, and a program therefor. More particularly, the present invention relates to a predictive coding method for quantization parameters in an image.

BACKGROUND ART

As a method for compressing and recording a moving image, the H.264/MPEG-4AVC (hereafter referred to as H.264) is known (ISO/IEC 14496-10; 2004 Information technology—Coding of audio-visual objects Part 10: Advanced Video Coding). The H.264 is widely used for one-segment terrestrial digital broadcasting.

The H.264 enables changing quantization parameters in macroblock units (16×16 pixels) by using the mb_qp_delta code. A formula 7-23 discussed in the above-mentioned document adds a difference value mb_qp_delta to a quantization parameter QPYPREV of a macroblock last decoded to change quantization parameters in macroblock units (16×16 pixels).

In recent years, an activity for internationally standardizing the High Efficiency Video Coding (HEVC) has been started. (The HEVC is a still higher efficiency coding method which is a successor of the H.264.) This activity, with the increase in screen size, considers division by larger block sizes than conventional macroblocks (16×16 pixels). According to JCT-VC contribution JCTVC-A205.doc, a basic block having a larger size is referred to as Largest Coding Tree Block (LCTB). The consideration premises a size of 64×64 pixels (JCT-VC contribution JCTVC-A205.doc <http://wftp3.itu.intlav-arch/jctvc-site/2010_04_A_Dresden/>). The LCTB is further divided into a plurality of subblocks. i.e., Coding Tree Blocks (CTBs) subjected to transform and quantization. As a division method, a region quadtree structure is used to divide a block into four subblocks (two vertically and two horizontally).

FIG. 2A illustrates the region quadtree structure. A thick frame 10000 indicates a basic block which is formed of 64×64 pixels to simplify descriptions. Each of subblocks 10001 and 10010 is formed of 16×16 pixels. Each of subblocks 10002 to 10009 is formed of 8×8 pixels. Subblocks are formed in this way and used for transform and other processing.

With the HEVC, it is considered that quantization parameter control is performed on a basic block basis in a similar way to macroblocks of the H.264. However, from the viewpoint of image quality, it is actually desirable to perform quantization parameter control on a subblock basis. In this case, quantization in smaller units is expected to be performed through quantization parameter control on a subblock basis.

However, processing is performed based on the region quadtree structure even if quantization in smaller units is possible. Therefore, it has not been possible to efficiently perform parallel processing on a subblock basis, disabling improvement in coding and decoding processing speed. Specifically, referring to FIG. 2A, the subblock 10001 (16×16 pixels), the subblocks 10002 to 10009 (8×8 pixels), and the subblock 10010 (16×16 pixels) are processed in this order. Since each of subblock quantization parameters is calculated by using a difference value from a quantization parameter of the preceding subblock as a predicted value, these quantization parameters needs to be subjected to successive processing, thus disabling efficient parallel processing on a subblock basis.

Further, when quantization parameter optimization is attempted for each subblock, difference values will vary since processing for acquiring a quantization parameter difference value is performed based on the region quadtree structure. For example, FIG. 2B illustrates a quantization parameter value indicated at the center of each subblock. The example in FIG. 2B assumes a case where quantization parameter values gradually change from the top left to the bottom right. This phenomenon is likely to occur in ordinary natural images. Since the subblock 10001 has a quantization parameter of 12 and the subblock 10002 has a quantization parameter of 14, the subblock 10002 has a difference value of +2 from the subblock 10001. Subsequent difference values are +4, −6, +6, −6, +−0, +2, +4, and +2. Acquiring difference values according to the region quadtree structure in this way randomly fluctuates difference values, causing a problem that large codes are generated.

SUMMARY OF INVENTION

The present invention is directed to enabling coding and decoding for each subblock to be performed in parallel to achieve not only high-speed processing but also high-efficiency quantization parameter coding and decoding.

According to an aspect of the present invention, an image coding apparatus includes: division means configured to divide an input image into a plurality of subblocks subjected to quantization control: subblock quantization parameter calculation means configured to calculate a quantization parameter of each of the subblocks; basic block quantization parameter calculation means configured to set a basic block including at least two subblocks and to calculate a quantization parameter of the basic block; difference value calculation means configured to calculate a difference value between the quantization parameter of the basic block and the quantization parameter of each subblock included in the basic block; and difference value coding means configured to code the difference value.

According to an exemplary embodiment of the present invention, it is possible to independently code and decode each subblock quantization parameter based on a basic block quantization parameter on a subblock basis, facilitating parallel processing on a subblock basis. Further, restraining a prediction error enables high-efficiency quantization parameter coding and decoding.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 3 is a detailed block diagram illustrating a quantization parameter coding unit in the image coding apparatus according to the first exemplary embodiment of the present invention.

FIG. 4 is a flowchart illustrating image coding processing by the image coding apparatus according to the first exemplary embodiment of the present invention.

FIG. 5A illustrates parallel processing at the time of coding.

FIG. 5B illustrates parallel processing at the time of coding.

FIG. 9A illustrates parallel processing in decoding.

FIG. 9B illustrates parallel processing in decoding.

DESCRIPTION OF EMBODIMENTS

Various exemplary embodiments, features, and aspects of the invention will be described in detail below with reference to the drawings.

Figure 1:
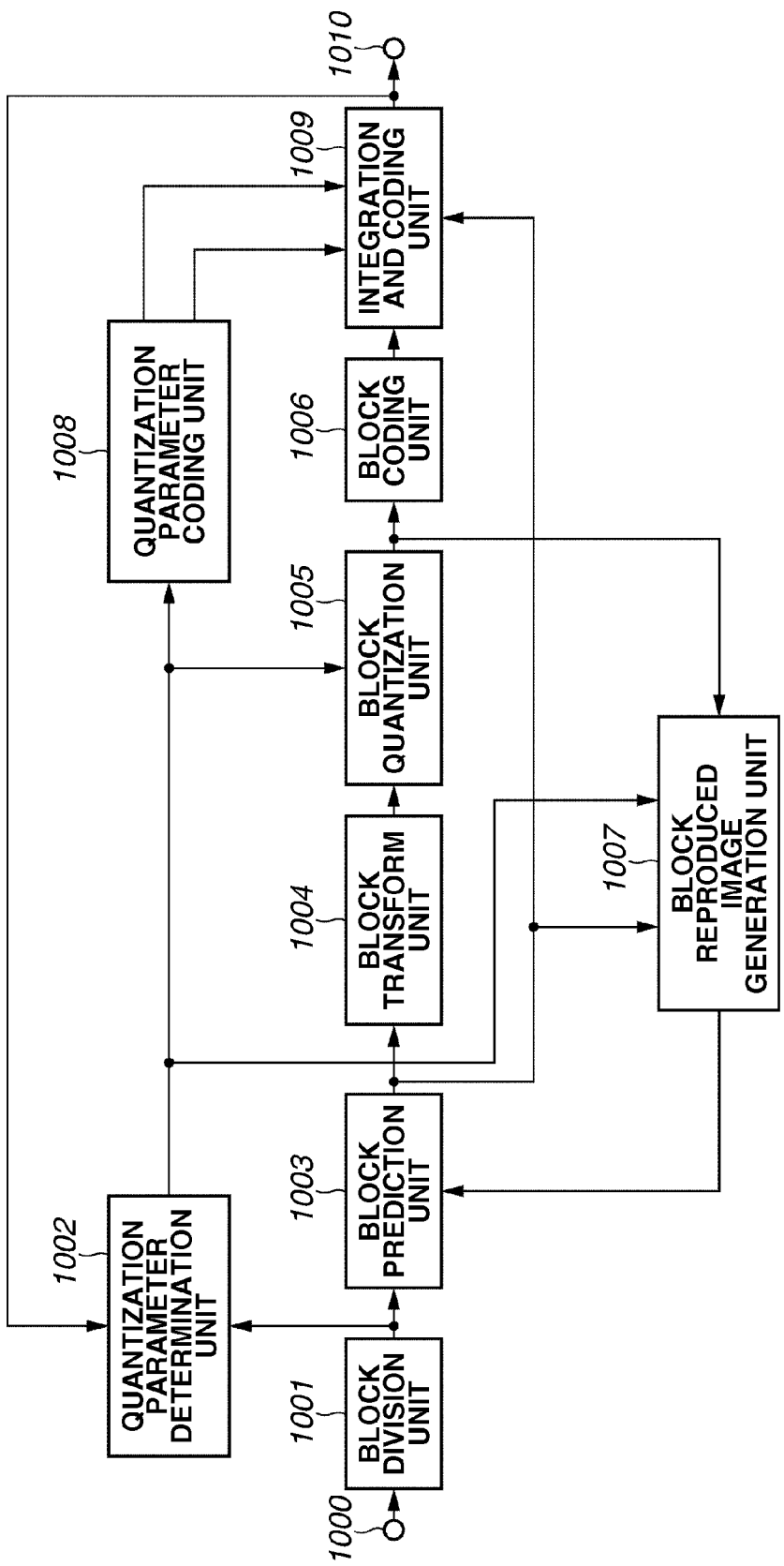
FIG. 1 is a block diagram illustrating a configuration of an image coding apparatus according to a first exemplary embodiment of the present invention.

FIG. 1 is a block diagram illustrating an image coding apparatus according to a first exemplary embodiment of the present invention. Referring to FIG. 1, the image coding apparatus inputs image data from a terminal 1000.

A block division unit 1001 divides the input image into a plurality of basic blocks. i.e., clips a basic block from the input image a plurality of number of times, and, if necessary, further divides each basic block into a plurality of subblocks. The image coding apparatus performs quantization control on a subblock basis. Although the input image is assumed to have 8-bit pixel values to simplify descriptions, the pixel value is not limited thereto. The size of a basic block is 64×64 pixels, and a minimum size of a subblock is 8×8 pixels. In this case, the basic block includes four subblocks. Although block division will be described below based on a method for dividing a block into four subblocks (two vertically and two horizontally), the shape and size of blocks are not limited thereto. The basic block needs to include at least two subblocks. Subblock division is not limited to any particular method. For example, the entire image may be divided into a plurality of subblocks after edge amount calculation and clustering. Specifically, small subblocks are set at a portion where there are many edges, and large subblocks are set at a flat portion. A quantization parameter determination unit 1002 determines a quantization parameter of each basic block and a quantization parameter of each subblock.

A block prediction unit 1003 performs prediction on a subblock basis formed by the block division unit 1001 to calculate a prediction error for each subblock. The block prediction unit 1003 applies intra-prediction to intra-frames of a still image and moving image, and also applies motion compensation prediction to a moving image. A block transform unit 1004 applies the orthogonal transform to a prediction error for each subblock to calculate an orthogonal transform coefficient. The orthogonal transform is not limited to any particular method, and may be based on the discrete cosine transform and Hadamard transform. A block quantization unit 1005 quantizes the above-mentioned orthogonal transform coefficient based on each subblock quantization parameter determined by the quantization parameter determination unit 1002. This quantization enables obtaining a quantization coefficient. A block coding unit 1006 applies variable-length coding to a quantization coefficient for each subblock acquired in this way to generate quantization coefficient code data. Coding is not limited to any particular method, and may be based on the Huffman code or arithmetic code. A block reproduced image generation unit 1007 reproduces a prediction error by performing an inverse operation of the block quantization unit 1005 and the block transform unit 1004 to generate a decoded image of the basic block based on a result of the processing by the block prediction unit 1003. The reproduced image data is stored and used for prediction by the block prediction unit 1003.

A quantization parameter coding unit 1008 encodes the basic block quantization parameter and each subblock quantization parameter determined by the quantization parameter determination unit 1002 to generate quantization parameter code data.

An integration and coding unit 1009 generates header information and encodes related to prediction, and integrates the quantization parameter code data generated by the quantization parameter coding unit 1008 and the quantization coefficient code data generated by the block coding unit 1006. The integration and coding unit 1009 outputs the generated bit stream to the outside via a terminal 1010.

Image coding processing by the image coding apparatus according to the present exemplary embodiment will be described below. Although, in the present exemplary embodiment, moving image data is input in frame units, still image data for one frame may be input.

The block division unit 1001 inputs image data for one frame from the terminal 1000, and divides the image data into a plurality of basic blocks each being formed of 64×64 pixels. If necessary, the block division unit 1001 further divides each basic block into a plurality of subblocks each being formed of at least 8×8 pixels. The quantization parameter determination unit 1002 and the block prediction unit 1003 input information about the division into subblocks and divided image data.

The block prediction unit 1003 performs prediction referring to the reproduced image stored in the block reproduced image generation unit 1007, generates a prediction error, and outputs the generated prediction error to the block transform unit 1004 and the block reproduced image generation unit 1007. The block transform unit 1004 applies the orthogonal transform to the input prediction error, calculates an orthogonal transform coefficient, and outputs the calculated orthogonal transform coefficient to the block quantization unit 1005.

In view of the amount of input codes occurring in each subblock, the quantization parameter determination unit 1002 determines an optimum quantization parameter based on the balance between the image quality and the amount of codes on a subblock basis. For example, a technique discussed in Japanese Patent Application Laid-Open No. 4-323961 can be used. The quantization parameter determination unit 1002 outputs each of the determined subblock quantization parameters to the block quantization unit 1005, the block reproduced image generation unit 1007, and the quantization parameter coding unit 1008.

The block quantization unit 1005 quantizes the orthogonal transform coefficient (input from the block transform unit 1004) based on each quantization parameter determined by the quantization parameter determination unit 1002 to generate a quantization coefficient. The block quantization unit 1005 outputs the generated quantization coefficient to the block coding unit 1006 and the block reproduced image generation unit 1007. The block reproduced image generation unit 1007 inputs the quantization coefficient, and reproduces an orthogonal transform coefficient based on each quantization parameter determined by the quantization parameter determination unit 1002. The block reproduced image generation unit 1007 applies inverse orthogonal transform to the reproduced orthogonal transform coefficient to reproduce a prediction error, generates a reproduced image based on the reproduced prediction error and the pixel value referred to at the time of prediction, and stores the reproduced image. The block coding unit 1006 encodes the quantization coefficient to generate quantization coefficient code data, and outputs the generated quantization coefficient code data to the integration and coding unit 1009.

The quantization parameter coding unit 1008 encodes on a basic block basis the quantization parameters determined by the quantization parameter determination unit 1002.

FIG. 3 is a detailed block diagram illustrating the quantization parameter coding unit 1008. Referring to FIG. 3, the quantization parameter coding unit 1008 inputs via a terminal 1 each subblock quantization parameter from the quantization parameter determination unit 1002 in FIG. 1. A quantization parameter storage unit 2 once stores the input subblock quantization parameters. A basic block quantization parameter determination unit 3 determines a basic block quantization parameter based on each subblock quantization parameter stored in the quantization parameter storage unit 2. A basic block quantization parameter coding unit 4 encodes the basic block quantization parameter to generate a basic block quantization parameter code. The basic block quantization parameter coding unit 4 outputs via a terminal 5 the generated basic block quantization parameter code to the integration and coding unit 1009 in FIG. 1. A subblock quantization parameter difference unit 6 acquires a difference between the basic block quantization parameter and each subblock quantization parameter. A subblock quantization parameter coding unit 7 encodes the difference to generate a subblock quantization parameter difference value code. The subblock quantization parameter coding unit 7 outputs via a terminal 8 the generated subblock quantization parameter difference value code to the integration and coding unit 1009 in FIG. 1.

With the above-mentioned configuration, the quantization parameter storage unit 2 stores on a basic block basis the subblock quantization parameters input from the terminal 1. When all of the subblock quantization parameters are stored in the quantization parameter storage unit 2, the basic block quantization parameter determination unit 3 calculates the basic block quantization parameter. With the present exemplary embodiment, the basic block quantization parameter determination unit 3 calculates an average of subblock quantization parameters. Referring to FIG. 2B, the average is 14.6. When the quantization parameter coding is performed on an integer basis, the basic block quantization parameter determination unit 3 rounds off the average 14.6 and, therefore, sets the basic block quantization parameter to 15. The basic block quantization parameter determination unit 3 outputs the determined basic block quantization parameter to the basic block quantization parameter coding unit 4 and the subblock quantization parameter difference unit 6. The basic block quantization parameter coding unit 4 encodes the input basic block quantization parameter through Golomb coding to generate a basic block quantization parameter code, and outputs the generated basic block quantization parameter code to the outside via the terminal 5.

The subblock quantization parameter difference unit 6 calculates a difference between each subblock quantization parameter and the basic block quantization parameter. Referring to FIG. 2B, difference values are −3, −1, +3, −3, +3, −3, −3, −1, −1, and +5 in order of the region quadtree structure. The subblock quantization parameter difference unit 6 outputs these difference values to the subblock quantization parameter coding unit 7. The subblock quantization parameter coding unit 7 encodes these difference values together with the existence or absence of a change. The quantization parameter of the first subblock 10001 differs from the basic block quantization parameter or 15. The subblock quantization parameter coding unit 7 encodes a one-bit value "1" indicating a change and a difference value "−3" through Golomb coding, and outputs the resultant code to the outside via the terminal 8 as subblock quantization parameter difference value coded data. Subsequently, the subblock quantization parameter coding unit 7 encodes the subblock quantization parameter difference value of the second subblock 10002. Since this difference value differs from the basic block quantization parameter, the subblock quantization parameter coding unit 7 outputs a Golomb code composed of a one-bit value "1" indicating a change and a subblock quantization parameter difference value "−1" to the outside via the terminal 8. Subsequently, in a similar way to the above, the subblock quantization parameter coding unit 7 encodes a one-bit value "1" indicating a change and a subblock quantization parameter difference value to generate subblock quantization parameter difference value coded data.

Referring back to FIG. 1, the integration and coding unit 1009 generate an image sequence, a frame header, and other codes. For each basic block, the integration and coding unit 1009 acquires information such as the prediction mode from the block prediction unit 1003 and encodes the information. Then, the integration and coding unit 1009 inputs the basic block quantization parameter code from the quantization parameter coding unit 1008. Subsequently, the integration and coding unit 1009 integrates the subblock quantization parameter difference value coded data and the quantization coefficient code data for each subblock, and outputs as a bit stream the integrated data to the outside via the terminal 1010.

FIG. 4 is a flowchart illustrating image coding processing by the image coding apparatus according to the first exemplary embodiment of the present invention. In step S001, the integration and coding unit 1009 generates a sequence, a frame header, and other codes, and outputs the generated codes to the outside via the terminal 1010.

In step S002, the block division unit 1001 sequentially clips each basic block from the input image starting with the top left corner thereof.

In step S003, the block division unit 1001 further divides each basic block into a plurality of subblocks.

In step S004, the quantization parameter determination unit 1002 determines subblock quantization parameters. In step S005, the image coding apparatus determines a basic block quantization parameter based on the subblock quantization parameters determined in step S004. To simplify descriptions, the image coding apparatus according to the present exemplary embodiment calculates an average of quantization parameters of subblocks in the basic block as a basic block quantization parameter.

In step S006, the image coding apparatus encodes the basic block quantization parameter (determined in step S005) through Golomb coding, and outputs the resultant code as a basic block quantization parameter code.

In step S007, the image coding apparatus encodes the subblock quantization parameter on a subblock basis. When using a quantization parameter which is the same as the basic block quantization parameter in order of the region quadtree structure, the image coding apparatus outputs a one-bit code "0". When using a different quantization parameter, the image coding apparatus outputs a one-bit code "1" and a difference between each subblock quantization parameter and the basic block quantization parameter.

In step S008, the image coding apparatus performs prediction for the subblock image data to obtain a prediction error, applies the orthogonal transform and quantization to the prediction error, encodes the obtained quantization coefficient, and outputs the quantization coefficient code data.

In step S009, the image coding apparatus applies inverse quantization and inverse transform to the obtained quantization coefficient to calculate a prediction error. The image coding apparatus generates a reproduced image of the relevant subblock based on the prediction error and a predicted value obtained from the reproduced image.

In step S010, the image coding apparatus determines whether coding processing is completed for all the subblocks in the basic block. When coding processing is completed for all the subblocks (YES in step S010), the processing proceeds to step S011. Otherwise, when coding processing is not completed for all the subblocks (NO in step S010), the processing returns to step S007 to process the following subblock.

In step S011, the image coding apparatus determines whether coding processing is completed for all the basic blocks. When coding processing is completed for all the basic blocks (YES in step S011), the processing ends. Otherwise, when coding processing is not completed for all the basic blocks (NO in step S011), the processing returns to step S002 to process the following basic block.

Particularly in steps S005 to S009, the above-mentioned configuration and operations enable coding each subblock quantization parameter difference value by using the basic block quantization parameter, thus restraining the amount of generated codes.

Although, in the present exemplary embodiment, an average of subblock quantization parameters is used as it is as a basic block quantization parameter, the basic block quantization parameter is not limited thereto, and may be an actual subblock quantization parameter value closest to the average. For example, although the average is 14.6 in the example in FIG. 2B, the actual subblock quantization parameter value closest to the average, i.e., 14 may be used instead of a value obtained by rounding off the average. Acquiring the subblock quantization parameter in this way enables setting the code indicating a change to "0", reducing the number of subblock quantization parameter difference values to be transmitted.

The above-mentioned configuration further enables efficiently performing prediction, quantization, transform, and coding in parallel, achieving high speed processing.

Figure 2A:
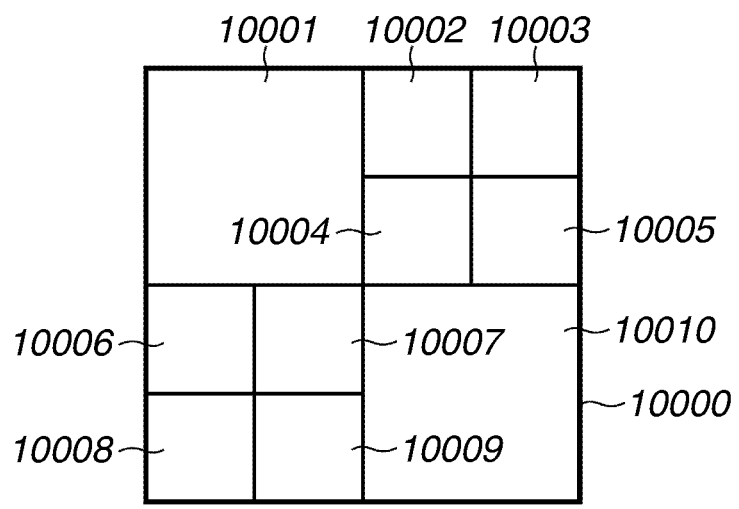
FIG. 2A illustrates example block division.
Figure 2B:
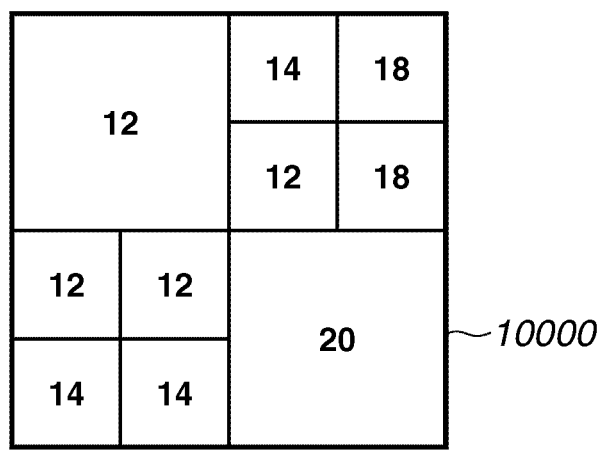
FIG. 2B illustrates example block division.

FIGS. 5A and 5B illustrate example parallel processing for applying quantization, transform, and coding processing to the subblocks 10001 to 10005 in the basic block 10000 illustrated in FIG. 2A. In this case, three processors are assumed to be used for coding processing to simplify descriptions. The processors A to C calculate each subblock quantization parameter (QP), calculate and code each subblock quantization parameter difference value (.delta.QP), apply orthogonal transform and quantization to the prediction error, and code the quantization coefficient. In this case, these codes are integrated by another processor.

FIG. 5A illustrates example conventional parallel processing. First of all, the image coding apparatus assigns the processing of the subblock 10001 to the processor A, the processing of the subblock 10002 to the processor B, and the processing of the subblock 10003 to the processor C. Processing time for QP calculation depends on the block size and image complexity. There is a tendency that quantization parameter calculation for the subblock 10001 having a larger block size takes a longer time than quantization parameter calculation for the subblocks 10002 and 10003.

Following the quantization parameter calculation, the image coding apparatus calculates quantization parameter difference values. The subblock quantization parameter calculation for the subblock 10001 needs to be completed to start the subblock quantization parameter difference value calculation for the subblock 10002. This means that the processor B waits until the processor A completes the subblock quantization parameter calculation for the subblock 10001. If it takes a longer time to calculate the quantization parameter of the subblock 10002 than to calculate that of the subblock 10003, the subblock quantization parameter calculation for the subblock 10002 needs to be completed to start the subblock quantization parameter difference value calculation for the subblock 10003. The processor C waits until the processor B completes the subblock quantization parameter calculation for the subblock 10002.

FIG. 5B illustrates example parallel processing according to the present exemplary embodiment. Similar to the conventional case, the image coding apparatus assigns the processing of the subblock 10001 to the processor A, the processing of the subblock 10002 to the processor B, and the processing of the subblock 10003 to the processor C. Following the subblock quantization parameter calculation, the image coding apparatus calculates subblock quantization parameter difference values. Since the basic block quantization parameter calculation is completed, the subblock quantization parameter difference value calculation for the subblock 10002 can be started immediately after calculating the subblock quantization parameter. Thus, the present invention achieves efficient parallel processing. In particular, when subblocks having a plurality of sizes exist, the present invention provides a profound effect of reducing processing interval.

Although, in the present exemplary embodiment, the basic block quantization parameter value itself is coded, prediction may be performed by using a basic block quantization parameter processed before.

Although, in the present exemplary embodiment, a basic block is formed of 64×64 pixels, and a subblock is formed of up to 8×8 pixels, the pixel configuration is not limited thereto. For example, the block size of a basic block can be changed to 128×128 pixels. The shape of basic block and subblock is not limited to a square, and may be a rectangle such as 8×4 pixels. The essence of the present invention remains unchanged.

Although, in the present exemplary embodiment, an average of subblock quantization parameters is considered as a basic block quantization parameter, the basic block quantization parameter is not limited thereto. It is of course possible, for example, that the basic block quantization parameter may be a median of subblock quantization parameters, or a most frequent subblock quantization parameter value. It is of course possible to prepare a plurality of calculation methods in this way, and select a most efficient basic block quantization parameter.

Although a one-bit code indicating a change is provided in the subblock quantization parameter difference value coded data, the processing is not limited thereto. It is of course possible to encode the subblock quantization parameter difference value even when there is no change.

Although, in the present exemplary embodiment, Golomb coding is used to encode the basic block quantization parameter, the subblock quantization parameter difference value, and the quantization coefficient, the processing is not limited thereto. It is of course possible to use, for example, Huffman coding and other arithmetic coding methods, and output the above-mentioned values as they are without coding.

Although the present exemplary embodiment has specifically been described based on frames using intra-prediction, it is apparent that the present exemplary embodiment is also applicable to frames that can use inter-prediction involving motion compensation in prediction.

Figure 6:
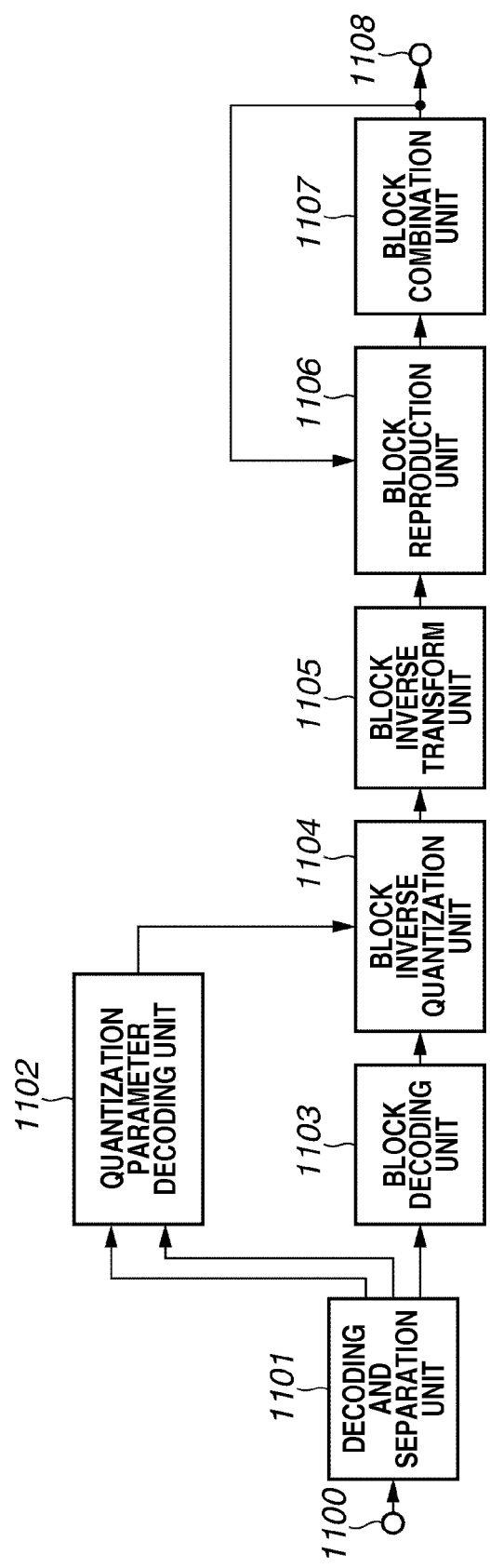
FIG. 6 is a block diagram illustrating a configuration of an image decoding apparatus according to a second exemplary embodiment of the present invention.

A second exemplary embodiment of the present invention will be described below based on an image decoding method for decoding code data coded by using the coding method according to the first exemplary embodiment of the present invention. FIG. 6 is a block diagram illustrating a configuration of an image decoding apparatus according to the second exemplary embodiment of the present invention.

The image decoding apparatus inputs a coded bit stream from a terminal 1100. The decoding and separation unit 1101 decodes the header information of the bit stream, separates required codes from the bit stream, and outputs the separated codes to the subsequent stage. The decoding and separation unit 1101 performs an inverse operation of the integration and coding unit 1009 in FIG. 1. A quantization parameter decoding unit 1102 decodes quantization parameter coded data. A block decoding unit 1103 decodes each subblock quantization coefficient code to reproduce a quantization coefficient. A block inverse quantization unit 1104 applies inverse quantization to the quantization coefficient based on the subblock quantization parameter reproduced by the quantization parameter decoding unit 1102 to reproduce an orthogonal transform coefficient. A block inverse transform unit 1105 performs inverse orthogonal transform of the block transform unit 1004 in FIG. 1 to reproduce a prediction error. A block reproduction unit 1106 reproduces subblock image data based on the prediction error and the decoded image data. A block combination unit 1107 arranges the reproduced subblock image data at respective positions to reproduce basic block image data.

Image decoding processing by the image decoding apparatus according to the present exemplary embodiment will be described below. Although, in the second exemplary embodiment, a moving image bit stream generated by the image coding apparatus according to the first exemplary embodiment is input in frame units, a still image bit stream for one frame may be input.

Referring to FIG. 6, the decoding and separation unit 1101 inputs the stream data for one frame from the terminal 1100, and decodes the header information required to reproduce an image. Subsequently, the decoding and separation unit 1101 outputs the basic block quantization parameter code to the quantization parameter decoding unit 1102. Subsequently, the decoding and separation unit 1101 also outputs the subblock quantization parameter difference value code to the quantization parameter decoding unit 1102.

Figure 7:
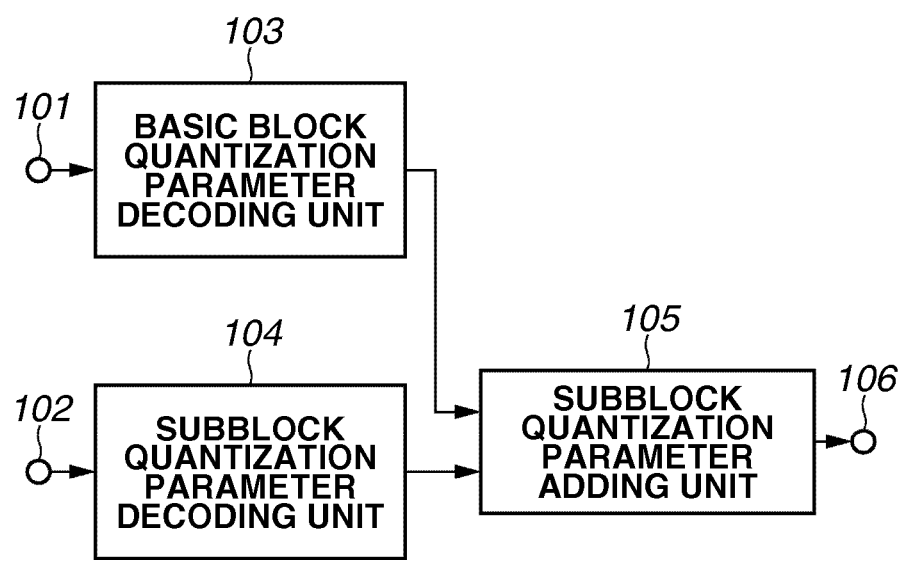
FIG. 7 is a detailed block diagram illustrating a quantization parameter decoding unit according to the second exemplary embodiment of the present invention.

FIG. 7 is a detailed block diagram illustrating the quantization parameter decoding unit 1102. The quantization parameter decoding unit 1102 inputs via a terminal 101 the basic block quantization parameter code from the decoding and separation unit 1101 in FIG. 6. The quantization parameter decoding unit 1102 also inputs via a terminal 102 the subblock quantization parameter difference coded data from the decoding and separation unit 1101 in FIG. 6. A basic block quantization parameter decoding unit 103 inputs the basic block quantization parameter code, and decodes the basic block quantization parameter code to reproduce a basic block quantization parameter. A subblock quantization parameter decoding unit 104 decodes the subblock quantization parameter difference value coded data to reproduce each subblock quantization parameter difference value. A subblock quantization parameter adding unit 105 adds the reproduced basic block quantization parameter and each subblock quantization parameter difference value to reproduce each subblock quantization parameter. The subblock quantization parameter adding unit 105 outputs via a terminal 106 each reproduced subblock quantization parameter to the block inverse quantization unit 1104 in FIG. 6.

The basic block quantization parameter decoding unit 103 inputs the basic block quantization parameter code from the terminal 101, decodes the basic block quantization parameter code by using the Golomb code to reproduce a basic block quantization parameter, and stores the resultant code.

The subblock quantization parameter decoding unit 104 inputs the subblock quantization parameter difference value coded data from the terminal 102, and decodes the subblock quantization parameter difference value coded data by using the Golomb code to reproduce a subblock quantization parameter difference value. Specifically, the subblock quantization parameter decoding unit 104 decodes a one-bit code indicating the presence or existence of a change with respect to the basic block quantization parameter. When there is no change, the subblock quantization parameter decoding unit 104 outputs zero as the subblock quantization parameter difference value to the subblock quantization parameter adding unit 105. When there is a change, the subblock quantization parameter decoding unit 104 subsequently decodes the subblock quantization parameter difference value, and outputs the resultant value to the subblock quantization parameter adding unit 105. The subblock quantization parameter adding unit 105 adds the subblock quantization parameter difference value to the reproduced basic block quantization parameter to reproduce a subblock quantization parameter, and outputs the reproduced subblock quantization parameter to the outside via the terminal 106.

Referring back to FIG. 6, the block decoding unit 1103 inputs the subblock quantization coefficient code data separated from the bit stream by the decoding and separation unit 1101, decodes the input subblock quantization coefficient code data by using the Golomb code to reproduce each subblock quantization coefficient, and outputs the reproduced subblock quantization coefficient to the block inverse quantization unit 1104. The block inverse quantization unit 1104 applies inverse quantization to the input subblock quantization coefficient and subblock quantization parameter to reproduce an orthogonal transform coefficient, and outputs the reproduced orthogonal transform coefficient to the block inverse transform unit 1105. The block inverse transform unit 1105 applies inverse transform to the reproduced orthogonal transform coefficient to reproduce a prediction error, and outputs the re-produced prediction error to the block reproduction unit 1106. The block reproduction unit 1106 inputs the reproduced prediction error, performs prediction based on the sur-rounding decoded pixel data or preceding frame pixel data to reproduce subblock image data, and outputs the reproduced subblock image data to the block combination unit 1107. The block combination unit 1107 arranges the reproduced subblock image data at respective positions to reproduce basic block image data, and outputs the reproduced basic block image data to the outside via the terminal 1108. The block combination unit 1107 also outputs the reproduced basic block image data to the block reproduction unit 1106 for predicted value calculation.

Figure 8:
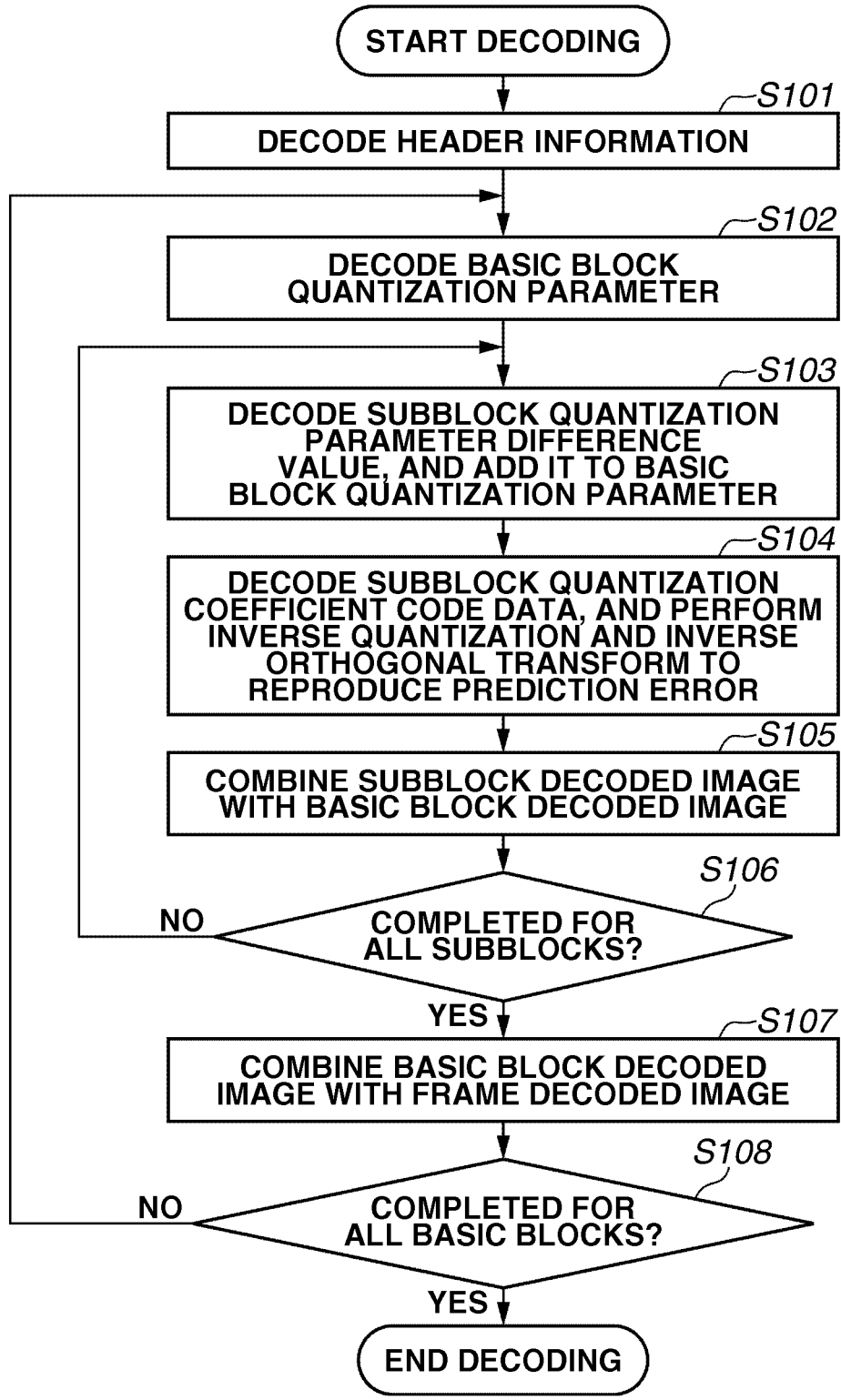
FIG. 8 is a flowchart illustrating image decoding processing by the image decoding apparatus according to the second exemplary embodiment of the present invention.

FIG. 8 is a flowchart illustrating image decoding processing by the image decoding apparatus according to the second exemplary embodiment of the present invention. In step S101, the decoding and separation unit 1101 decodes the header information.

In step S102, the basic block quantization parameter decoding unit 103 decodes the basic block quantization parameter code to reproduce a basic block quantization parameter.

In step S103, the subblock quantization parameter decoding unit 104 decodes the subblock quantization parameter difference value coded data to reproduce a subblock quantization parameter difference value. The subblock quantization parameter adding unit 105 adds the basic block quantization parameter to the subblock quantization parameter difference value to reproduce a subblock quantization parameter.

In step S104, the image decoding apparatus decodes the subblock quantization coefficient code data to reproduce a quantization coefficient, and applies inverse quantization and inverse orthogonal transform to the decoded subblock quantization co-efficient code data to reproduce a prediction error. The image decoding apparatus further performs prediction based on the surrounding decoded pixel data or preceding frame pixel data to reproduce a subblock decoded image.

In step S105, the image decoding apparatus arranges the subblock decoded image to the basic block decoded image. In step S106, the image decoding apparatus determines whether decoding processing is completed for all the subblocks in the relevant basic block. When decoding processing is completed for all the subblocks (YES in step S106), the processing proceeds to step S107. When decoding processing is not completed for all the subblocks (NO in step S106), the processing returns to step S103 to process the following subblock.

In step S107, the image decoding apparatus arranges the basic block decoded image to the frame decoded image. In step S108, the image decoding apparatus determines whether decoding processing is completed for all the basic blocks. When decoding processing is completed for all the basic blocks (YES in step S108), the image decoding apparatus stops all operations to terminate processing. When decoding processing is not completed for all the basic blocks (NO in step S108), the processing returns to step S102 for the following basic block.

The above-mentioned configuration and operations enable decoding a bit stream with reduced amount of codes, generated in the first exemplary embodiment, to obtain the reproduced image.

If code identification is possible for each subblock by using a delimiter symbol, it is possible to effectively perform different operations in parallel, i.e., to reproduce subblock quantization parameters, apply inverse quantization and inverse transform to reproduced subblocks, and reproduce image data, thus achieving high-speed decoding.

FIGS. 9A and 9B illustrate example parallel processing for applying decoding, inverse quantization, and inverse transform processing to the subblocks 10001 to 10006 in the basic block 10000 illustrated in FIG. 2A to reproduce prediction errors. Similar to FIGS. 5A and 5B according to the first exemplary embodiment of the present invention, three processors are assumed to be used to simplify descriptions. In this example, the three processors decode each subblock quantization parameter difference value (.delta.QP) to reproduce a quantization parameter (QP), decode the quantization coefficient, and applies inverse quantization and inverse orthogonal transform to the quantization coefficient. In this case, another processor separates these codes.

FIG. 9A illustrates example conventional parallel processing. First of all, the image decoding apparatus assigns the processing of the subblock 10001 to the processor A, the processing of the subblock 10002 to the processor B, and the processing of the subblock 10003 to the processor C. Since the processor A, as a first processor, decodes the subblock quantization parameter itself. The processors B and C decode each subblock quantization parameter difference value, and then reproduce a subblock quantization parameter. The above-mentioned processing is achieved by adding the subblock quantization parameter of subblocks before becoming a subblock quantization parameter predicted value, and the subblock quantization parameter difference value.

The decoding of the quantization parameter of the subblock 10001 needs to be completed to start the subblock quantization parameter reproduction for the subblock 10002. This means that the processor B waits until the processor A completes the quantization parameter reproduction for the subblock 10001.

This also applies to the quantization parameter reproduction for the subblock 10002. The processor C waits until the processor B completes the quantization parameter reproduction for the subblock 10002. Subsequently, each of processors that completed processing processes subblocks in order of the region quadtree structure, i.e., in order of the subblock 10004, the subblock 10005, and the subblock 10006. The quantization parameter reproduction for the subblock 10005 needs to be completed to start the subblock quantization parameter reproduction for the subblock 10006. This means that the processor C waits until the processor A completes the quantization parameter reproduction for the subblock 10005.

FIG. 9B illustrates example parallel processing according to the present exemplary embodiment. First, the processor A decodes and stores the basic block quantization parameter. Subsequently, similar to the conventional case, the image decoding apparatus assigns the processing of the subblock 10001 to the processor A, the processing of the subblock 10002 to the processor B, and the processing of the subblock 10003 to the processor C. After decoding the subblock quantization parameter difference value, the image decoding apparatus reproduces a subblock quantization parameter. Since the basic block quantization parameter has been reproduced, the quantization parameter reproduction for the subblock 10002 can be started immediately after decoding the subblock quantization parameter difference value. The present invention achieves efficient parallel processing. In particular, when subblocks having a plurality of sizes exist, the present invention provides a profound effect on reducing processing interval.

Suppose a case where only a subblock 10008 in FIG. 2A is clipped by using an editing application for clipping a part from image data. With the conventional case, the subblocks 10001 to 10007 need to be decoded. According to the present invention, decoding only the subblocks 10001 and 10006 enables necessary decoding processing including intra-prediction. Thus, the processing speed can be improved by skipping the decoding processing.

Similar to the first exemplary embodiment of the present invention, block size, processing unit size, processing units referred to and pixel arrangements, and codes are not limited thereto.

Although, in the second exemplary embodiment, the Golomb code is used to decode the basic block quantization parameter, the subblock quantization parameter difference value, and the quantization coefficient, the processing is not limited thereto. It is of course possible to use, for example, Huffman coding and other arithmetic coding methods, and output the above-mentioned values as they are without coding.

Although the second exemplary embodiment has specifically been described based on frames using intra-prediction, it is apparent that the present exemplary embodiment is also applicable to frames that can use inter-prediction involving motion compensation in prediction.

Figure 10:
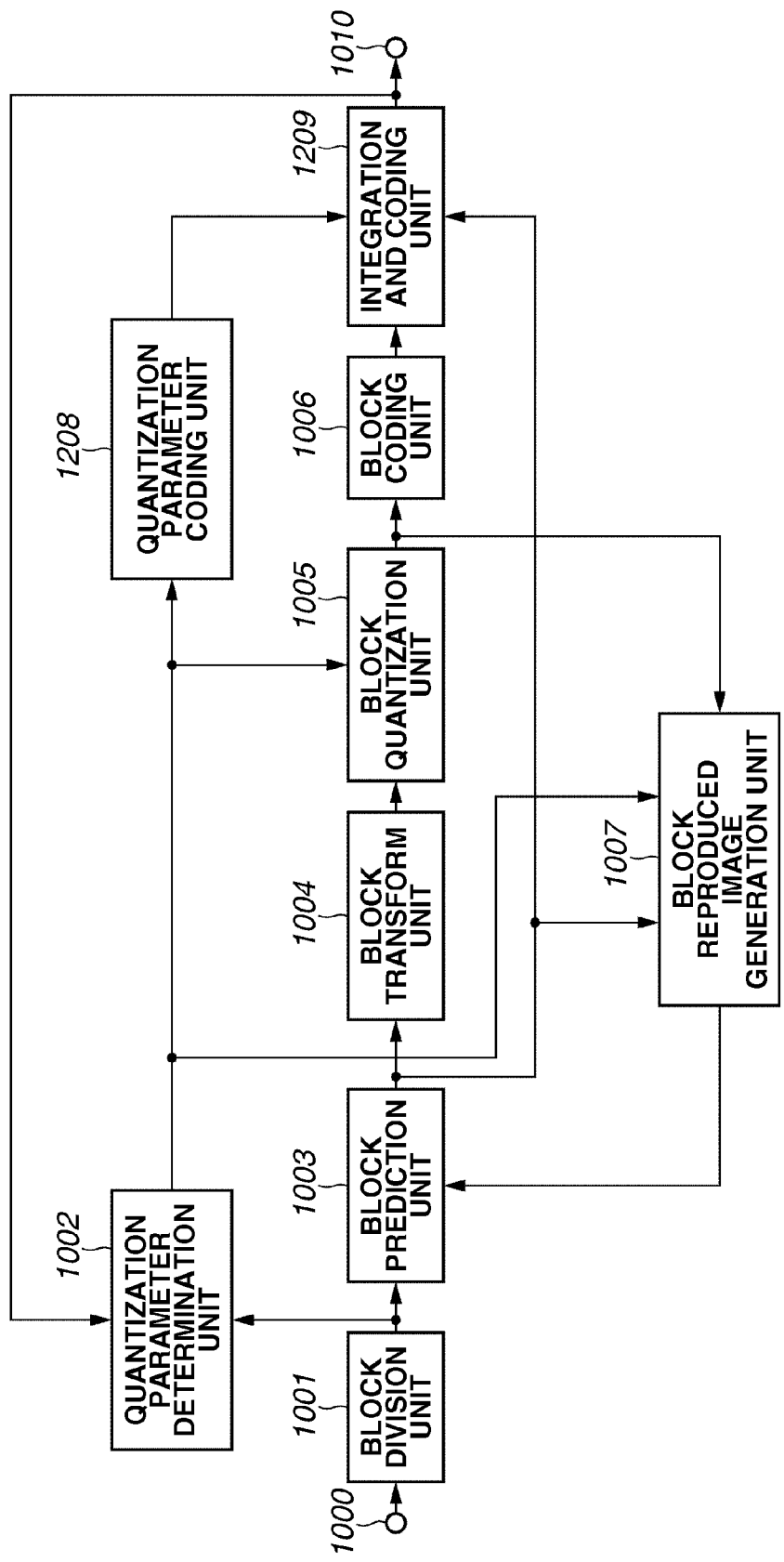
FIG. 10 is a block diagram illustrating a configuration of an image coding apparatus according to a third exemplary embodiment of the present invention.

FIG. 10 is a block diagram illustrating an image coding apparatus according to a third exemplary embodiment of the present invention. In the third exemplary embodiment, a quantization parameter of the first subblock (hereinafter referred to as first subblock quantization parameter) is considered as a basic block quantization parameter, and the basic block quantization parameter is not encoded individually. Unlike the first exemplary embodiment of the present invention, the third exemplary embodiment does not use a code indicating the existence or absence of a change. However, similar to the first exemplary embodiment of the present invention, coding may be performed by using a code indicating the existence or absence of a change. Referring to FIG. 10, elements having the same function as those in the first exemplary embodiment (FIG. 1) are assigned the same reference numerals and duplicated descriptions will be omitted.

A quantization parameter coding unit 1208 encodes a subblock quantization parameter to generate quantization parameter code data. An integration and coding unit 1209 generates header information and a code related to prediction, and integrates the quantization parameter code data generated by the quantization parameter coding unit 1208 and the quantization coefficient code data generated by the block coding unit 1006.

Figure 11:
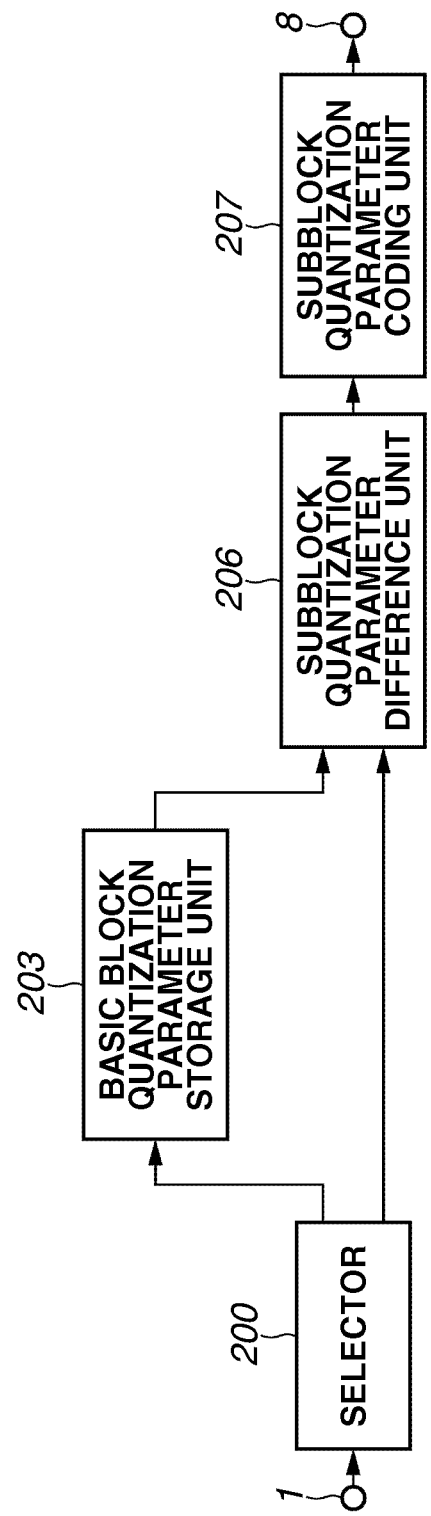
FIG. 11 is a detailed block diagram illustrating a quantization parameter coding unit in an image coding apparatus according to the third exemplary embodiment of the present invention.

FIG. 11 is a detailed block diagram illustrating the quantization parameter coding unit 1208. Referring to FIG. 11, elements having the same function as those in the first exemplary embodiment (FIG. 3) are assigned the same reference numerals and duplicated descriptions will be omitted.

A selector 200 selects a destination depending on the subblock position for the input subblock quantization parameter. A basic block quantization parameter storage unit 203 stores the first subblock quantization parameter as a basic block quantization parameter in order of the region quadtree structure of the basic block. A subblock quantization parameter difference unit 206 calculates a difference value between each of subsequent subblock quantization parameters and the basic block quantization parameter. A subblock quantization parameter coding unit 207 encodes the first subblock quantization parameter and each subblock quantization parameter difference value.

Similar to the first exemplary embodiment, the quantization parameter coding unit 1208 having the above-mentioned configuration inputs subblock quantization parameters from the terminal 1 in order of the region quadtree structure. The selector 200 outputs the first subblock quantization parameter to the basic block quantization parameter storage unit 203 in order of the region quadtree structure. The selector 200 outputs subsequent subblock quantization parameters to the subblock quantization parameter difference unit 206.

The basic block quantization parameter storage unit 203 stores the first subblock quantization parameter as a basic block quantization parameter. Then, the subblock quantization parameter difference unit 206 also inputs the first subblock quantization parameter. Since the relevant subblock quantization parameter is the first subblock quantization parameter in the basic block, the subblock quantization parameter difference unit 206 does not calculate a difference and outputs the relevant subblock quantization parameter as it is to the subblock quantization parameter coding unit 207 on the subsequent stage. The subblock quantization parameter coding unit 207 encodes the input subblock quantization parameter through Golomb coding, and outputs the resultant code to the outside via the terminal 8 as subblock quantization parameter coded data.

Subsequently, the subblock quantization parameter difference unit 206 inputs from the terminal 1 via the selector 200 subblock quantization parameters in order of the region quadtree structure. The subblock quantization parameter difference unit 206 calculates a difference value between each input subblock quantization parameter and the basic block quantization parameter stored in the basic block quantization parameter storage unit 203. The subblock quantization parameter coding unit 207 encodes the subblock quantization parameter difference value through Golomb coding to generate subblock quantization parameter difference value coded data, and outputs the generated subblock quantization parameter difference value coded data to the outside via the terminal 8 as subblock quantization parameter coded data. Subsequently, the subblock quantization parameter coding unit 207 obtains and encodes a subblock quantization parameter difference value of each subblock in the basic block.

Figure 12:
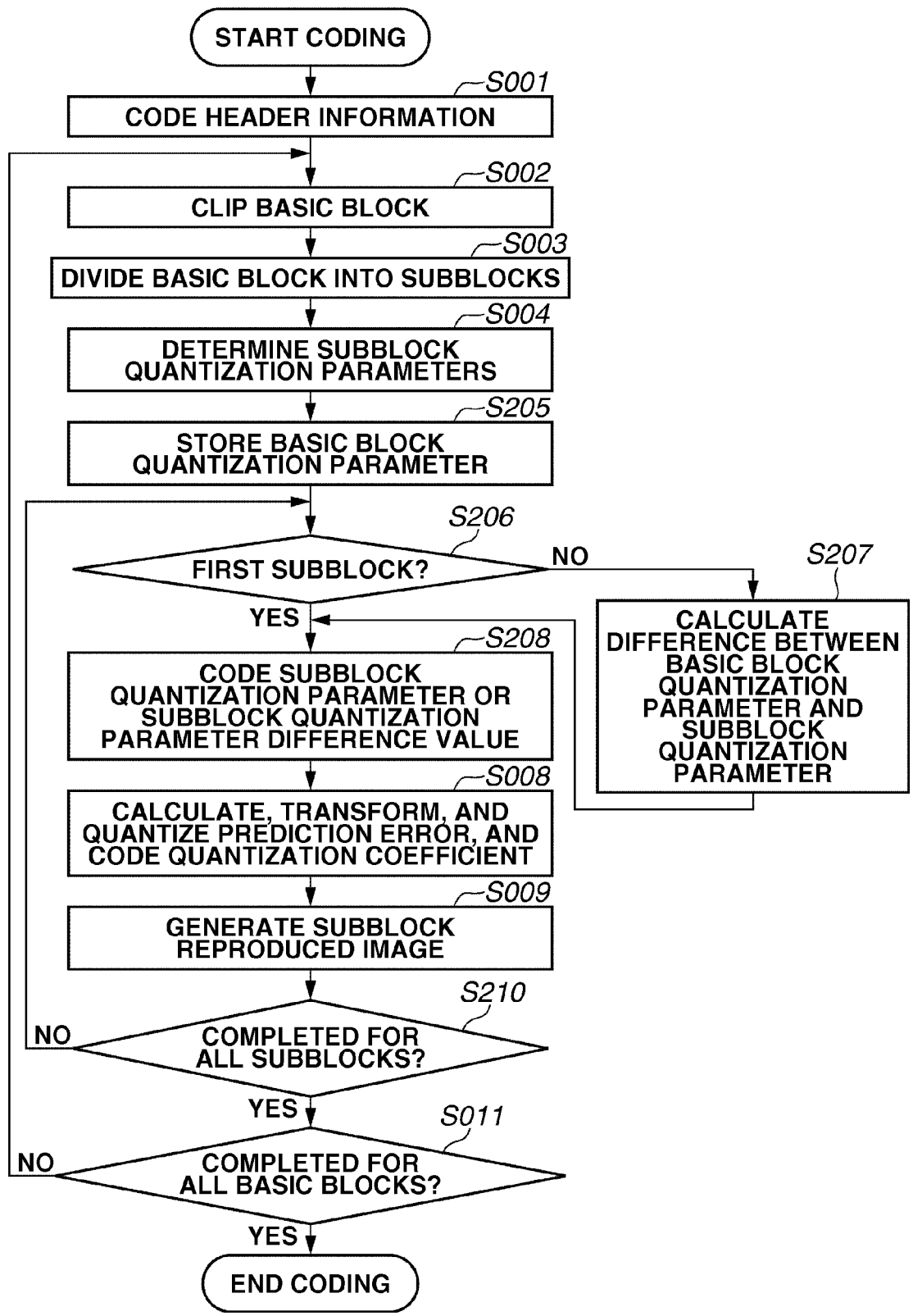
FIG. 12 is a flowchart illustrating image coding processing by the image coding apparatus according to the third exemplary embodiment of the present invention.

FIG. 12 is a flowchart illustrating image coding processing by the image coding apparatus according to the third exemplary embodiment of the present invention. Referring to FIG. 12, elements having the same function as those in the first exemplary embodiment (FIG. 4) are assigned the same reference numerals and duplicated descriptions will be omitted.

In steps S001 to S004, similar to the first exemplary embodiment of the present invention, the image coding apparatus clips a basic block, divides the basic block into a plurality of subblocks, and determines subblock quantization parameters.

In step S205, the image coding apparatus stores the first subblock quantization parameter as a basic block quantization parameter.

In step S206, the image coding apparatus determines whether the input subblock is the first subblock in the basic block. When the input subblock is the first subblock, the processing proceeds to step S208 (YES in step S206). Otherwise, when the input subblock is not the first subblock (NO in step S206), the processing proceeds to step S207. In step S207, the image coding apparatus calculates a difference between the basic block quantization parameter stored in step S205 and the input subblock quantization parameter.

In step S208, the image coding apparatus encodes the input subblock quantization parameter or the subblock quantization parameter difference value through Golomb coding, and outputs the resultant code as subblock quantization parameter coded data.

In steps S008 and S009, the image coding apparatus performs similar processing to the image coding apparatus according to the first exemplary embodiment of the present invention. In step S210, the image coding apparatus determines whether coding processing is completed for all the subblocks in the basic block. When coding processing is not completed for all the subblocks (NO in step S210), the processing proceeds to step S206 to process the following subblock. When coding processing is completed for all the subblocks (YES in step S210), the processing proceeds to step S011. Subsequently, the image coding apparatus performs coding processing for the entire image similar to the image coding apparatus according to the first exemplary embodiment of the present invention. With the above-mentioned configuration and operations, considering the first subblock quantization parameter as a basic block quantization parameter eliminates the need of transferring the basic block quantization parameter, resulting in improved coding efficiency.

The above-mentioned configuration and operations further enable effective parallel processing similar to the first exemplary embodiment of the present invention. Specifically, referring to FIG. 5A, at the first stage of parallel processing, the processors B and C need to wait until the processor A completes the first subblock quantization parameter calculation. Subsequently, however, the processors B and C can calculate the quantization parameter difference value of the subblock 10005 without waiting until the processor A completes the processing of the subblock 10004.

It is of course possible to provide a code for switching between the method for coding the basic block quantization parameter in the first exemplary embodiment and the method for considering the first subblock quantization parameter as a basic block quantization parameter in the present exemplary embodiment, and select whichever has higher coding efficiency.

Although the same coding method is applied to the first subblock quantization parameter (basic block quantization parameter) and subsequent subblock quantization parameter difference values, the processing is not limited thereto. It is of course possible to apply different coding methods to the first subblock quantization parameter and subsequent subblock quantization parameter difference values.

Although, in the third exemplary embodiment, the basic block quantization parameter, the subblock quantization parameter difference value, and the quantization coefficient are encoded through Golomb coding, the processing is not limited thereto. It is of course possible to use, for example, Huffman coding and other arithmetic coding methods.

Although the third exemplary embodiment has specifically been described based on frames using intra-prediction, it is apparent that the present exemplary embodiment is also applicable to frames that can use inter-prediction involving motion compensation in prediction.

Figure 13:
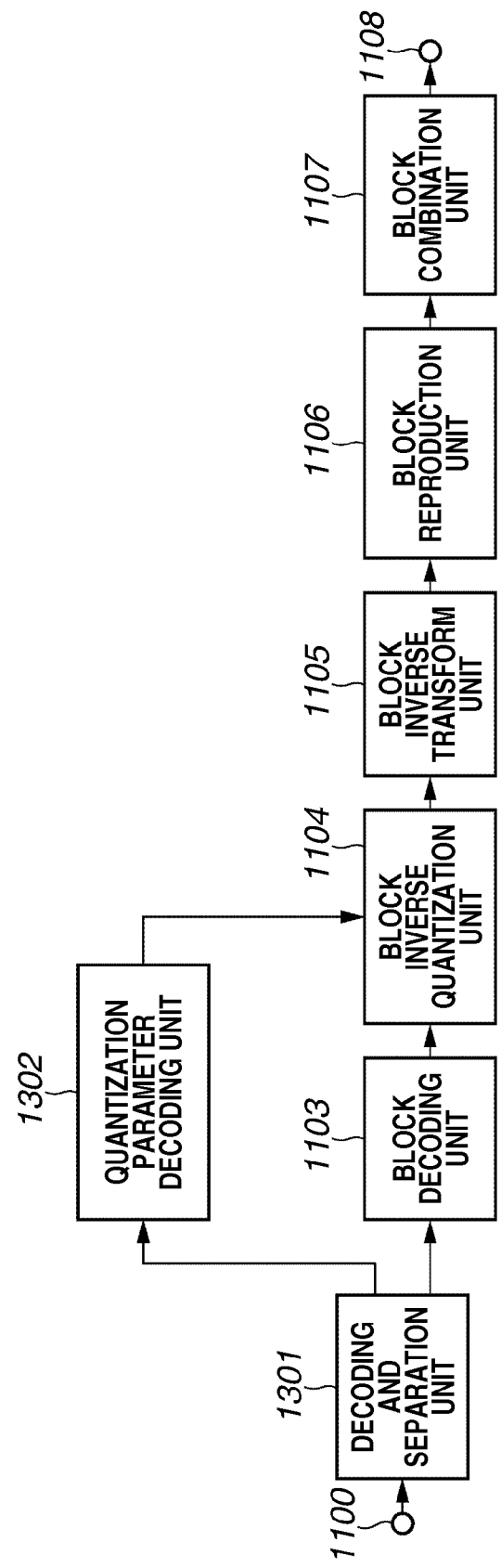
FIG. 13 is a block diagram illustrating a configuration of an image decoding apparatus according to a fourth exemplary embodiment of the present invention.

A fourth exemplary embodiment of the present invention will be described below based on an image decoding method for decoding code data coded by using the coding method according to the third exemplary embodiment of the present invention. FIG. 13 is a block diagram illustrating an image decoding apparatus for decoding code data coded by using the coding method according to the third exemplary embodiment of the present invention. Referring to FIG. 13, elements having the same function as those in the second exemplary embodiment (FIG. 6) are assigned the same reference numerals and duplicated descriptions will be omitted.

Referring to FIG. 13, a decoding and separation unit 1301 decodes the header information of a bit stream, separates required codes from the bit stream, and outputs the separated codes to the subsequent stage. A quantization parameter decoding unit 1302 reproduces a subblock quantization parameter. The decoding and separation unit 1301 and the quantization parameter decoding unit 1302 differs in quantization parameter code data from the decoding and separation unit 1101 and the quantization parameter decoding unit 1102 (FIG. 6), respectively, according to the second exemplary embodiment.

Image decoding processing by the image decoding apparatus according to the present exemplary embodiment will be described below. Although, in the present exemplary embodiment, a moving image bit stream generated by the image coding apparatus according to the third exemplary embodiment is input in frame units, a still image bit stream for one frame may be input.

Similar to the second exemplary embodiment, the decoding and separation unit 1301 inputs stream data for one frame from the terminal 1100, and decodes the header information required to reproduce an image. Subsequently, the quantization parameter decoding unit 1302 inputs the subblock quantization parameter coded data in order of the region quadtree structure.

Figure 14:
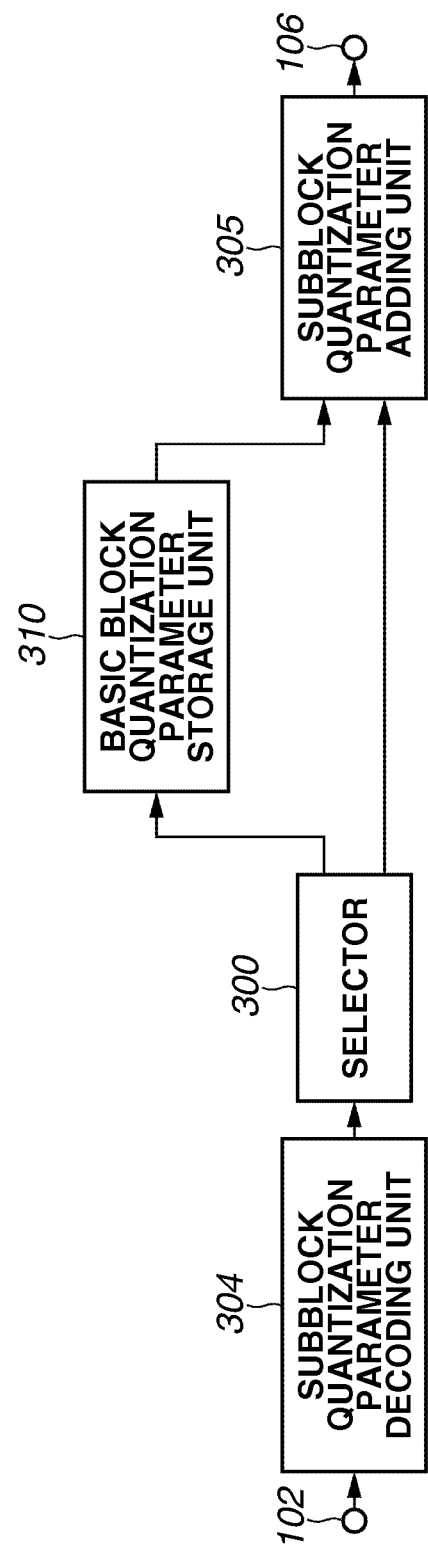
FIG. 14 is a detailed block diagram illustrating a quantization parameter decoding unit in the image decoding apparatus according to the fourth exemplary embodiment of the present invention.

FIG. 14 is a detailed block diagram illustrating the quantization parameter decoding unit 1302. Referring to FIG. 14, elements having the same function as those in the second exemplary embodiment (FIG. 7) are assigned the same reference numerals and duplicated descriptions will be omitted.

A subblock quantization parameter decoding unit 304 decodes the subblock quantization parameter and subblock quantization parameter difference value coded data to reproduce each subblock quantization parameter difference value. A selector 300 selects a destination depending on the subblock position for the input subblock quantization parameter. A basic quantization parameter storage unit 310 stores as a basic block quantization parameter the subblock quantization parameter decoded first. A subblock quantization parameter adding unit 305 adds the basic block quantization parameter and each subblock quantization parameter difference value to reproduce each subblock quantization parameter.

With the above-mentioned configuration, the selector 300 selects the basic block quantization parameter storage unit 310 as a destination when decoding of the basic block is started. The subblock quantization parameter decoding unit 304 inputs the subblock quantization parameter coded data of the first subblock in the basic block from the terminal 102, and decodes the subblock quantization parameter coded data by using the Golomb code to reproduce a subblock quantization parameter. The basic block quantization parameter storage unit 310 inputs the first subblock quantization parameter via the selector 300, and stores the subblock quantization parameter during processing of the relevant basic block. Then, the subblock quantization parameter adding unit 305 also inputs the first subblock quantization parameter. Since the difference value does not exist for the first subblock, the subblock quantization parameter adding unit 305 outputs the reproduced subblock quantization parameter as it is to the outside via the terminal 106. When the basic block quantization parameter storage unit 310 stores the first subblock quantization parameter, the selector 300 selects the subblock quantization parameter adding unit 305 as a destination.

Subsequently, the subblock quantization parameter decoding unit 304 inputs the second and subsequent subblock quantization parameter difference value coded data. The subblock quantization parameter decoding unit 304 decodes the input subblock quantization parameter difference value coded data by using the Golomb code to reproduce a subblock quantization parameter difference value. The subblock quantization parameter adding unit 305 adds the subblock quantization parameter difference value (input via the selector 300) to the basic block quantization parameter stored in the basic block quantization parameter storage unit 310. The subblock quantization parameter adding unit 305 reproduces a subblock quantization parameter in this way, and outputs the reproduced subblock quantization parameter to the outside via the terminal 106. Subsequently, the quantization parameter decoding unit 1302 decodes the subblock quantization parameter of each subblock in the basic block, calculates the subblock quantization parameter difference value, and adds the calculated subblock quantization parameter difference value to the basic block quantization parameter to reproduce a subblock quantization parameter.

Figure 15:
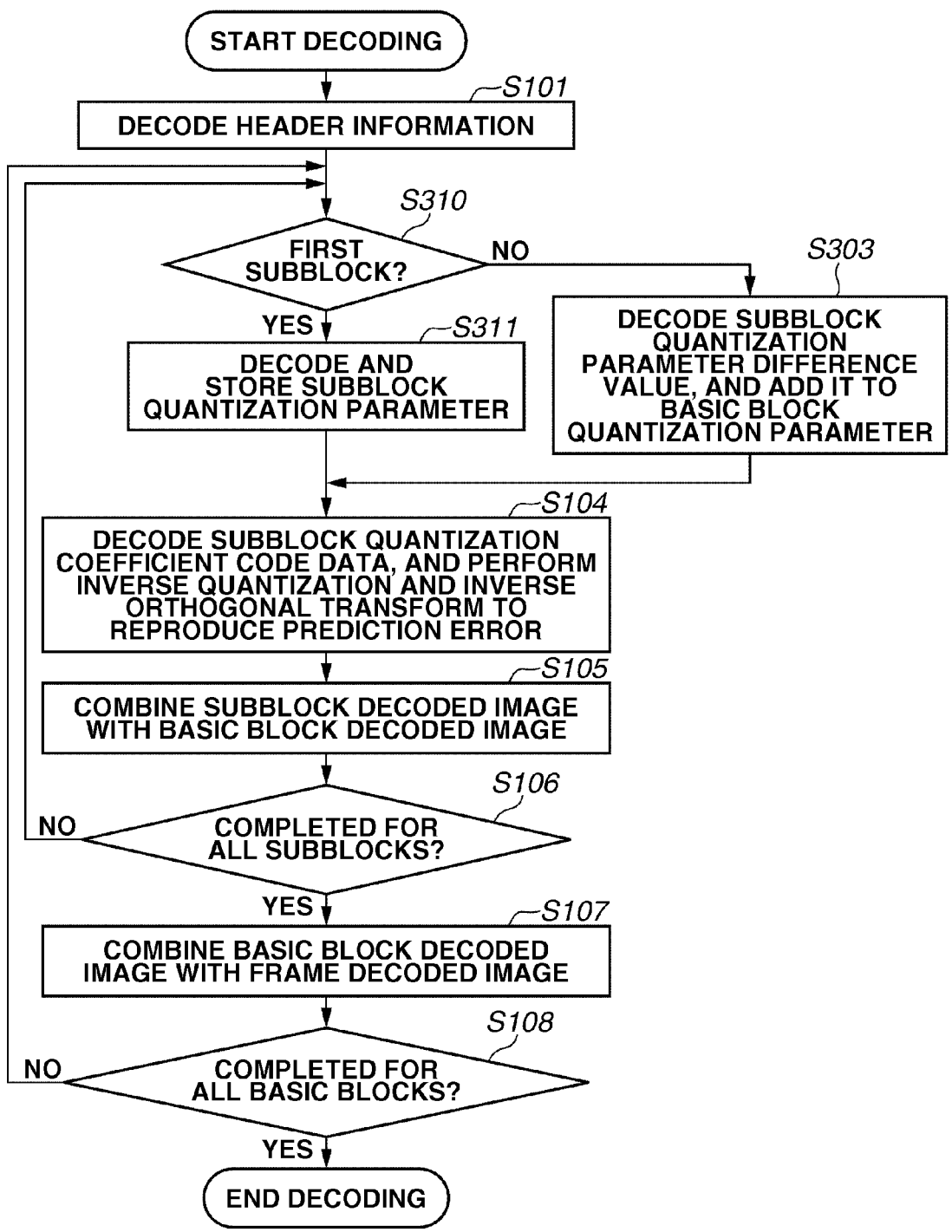
FIG. 15 is a flowchart illustrating image decoding processing by the image decoding apparatus according to the fourth exemplary embodiment of the present invention.

FIG. 15 is a flowchart illustrating image decoding processing according to the fourth exemplary embodiment of the present invention. Referring to FIG. 15, elements having the same function as those in the second exemplary embodiment (FIG. 8) are assigned the same reference numerals and duplicated descriptions will be omitted.

In step S101, the image decoding apparatus decodes the header information similar to the image decoding apparatus according to the second exemplary embodiment of the present invention. In step S310, the image decoding apparatus determines whether the subblock subjected to decoding is the first subblock in the basic block. When the subblock subjected to decoding is the first subblock (YES in step S310), the processing proceeds to step S311. Otherwise, when the subblock subjected to decoding is not the first subblock (NO in step S310), the processing proceeds to step S303.

In step S311, the image decoding apparatus decodes the code related to the input subblock quantization parameter, i.e., the subblock quantization parameter coded data by using the Golomb code, and stores the resultant code as a basic block quantization parameter. Then, the processing proceeds to step S104 to generate a decoded image of the first subblock.

In step S303, the image decoding apparatus decodes the code related to the input subblock quantization parameter, i.e., the subblock quantization parameter difference value coded data by using the Golomb code to reproduce a subblock quantization parameter difference value. The image decoding apparatus adds the reproduced subblock quantization parameter difference value to the basic block quantization parameter stored in step S311, and uses a result of addition as a subblock quantization parameter. The processing proceeds to step S104 to generate decoded images of the second and subsequent subblocks.

Subsequently, similar to the second exemplary embodiment of the present invention, the image decoding apparatus generates a subblock decoded image and reproduces a frame image.

The above-mentioned configuration and operations enable decoding coded data with reduced amount of codes generated in the third exemplary embodiment, without individually encoding the basic quantization parameter.

The above-mentioned configuration and operations further enable effective parallel processing similar to the second exemplary embodiment of the present invention. Specifically, referring to FIG. 9B, the processor A performs the first subblock quantization parameter decoding for the basic block instead of the basic block quantization parameter decoding. This processing replaces the basic block quantization parameter decoding and the first subblock quantization parameter difference value decoding. This means that, at the first stage of parallel processing, the processors B and C need to wait until the processor A completes the decoding of the first subblock quantization parameter. Subsequently, the processors B and C can start the reproduction of all subblock quantization parameters without waiting until the processor A completes the processing of other subblocks.

Although, in the fourth exemplary embodiment, the Golomb code is used to decode the basic block quantization parameter, the subblock quantization parameter difference value, and the quantization coefficient, the processing is not limited thereto. It is of course possible to use, for example, Huffman coding and other arithmetic coding methods.

When there is provided a code for switching between the method for coding the basic block quantization parameter in the third exemplary embodiment and the method for considering the first subblock quantization parameter as a basic block quantization parameter in the fourth exemplary embodiment, the image decoding apparatus interprets the code and executes step S102 in FIG. 8. Alternatively, the image decoding apparatus preferably selects whether steps S310, S311, and S303 in FIG. 15 are to be executed.

Although the fourth exemplary embodiment has specifically been described based on frames using intra-prediction, it is apparent that the present exemplary embodiment is also applicable to frames that can use inter-prediction involving motion compensation in prediction.

A fifth exemplary embodiment of the present invention will be described below based on the determination of the basic block quantization parameter by using the subblock quantization parameter in the last basic block.

An image coding apparatus according to the fifth exemplary embodiment has a similar configuration to the image coding apparatus according to the third exemplary embodiment of the present invention (FIG. 10), with a difference in the configuration of the quantization parameter coding unit 1208.

Figure 16:
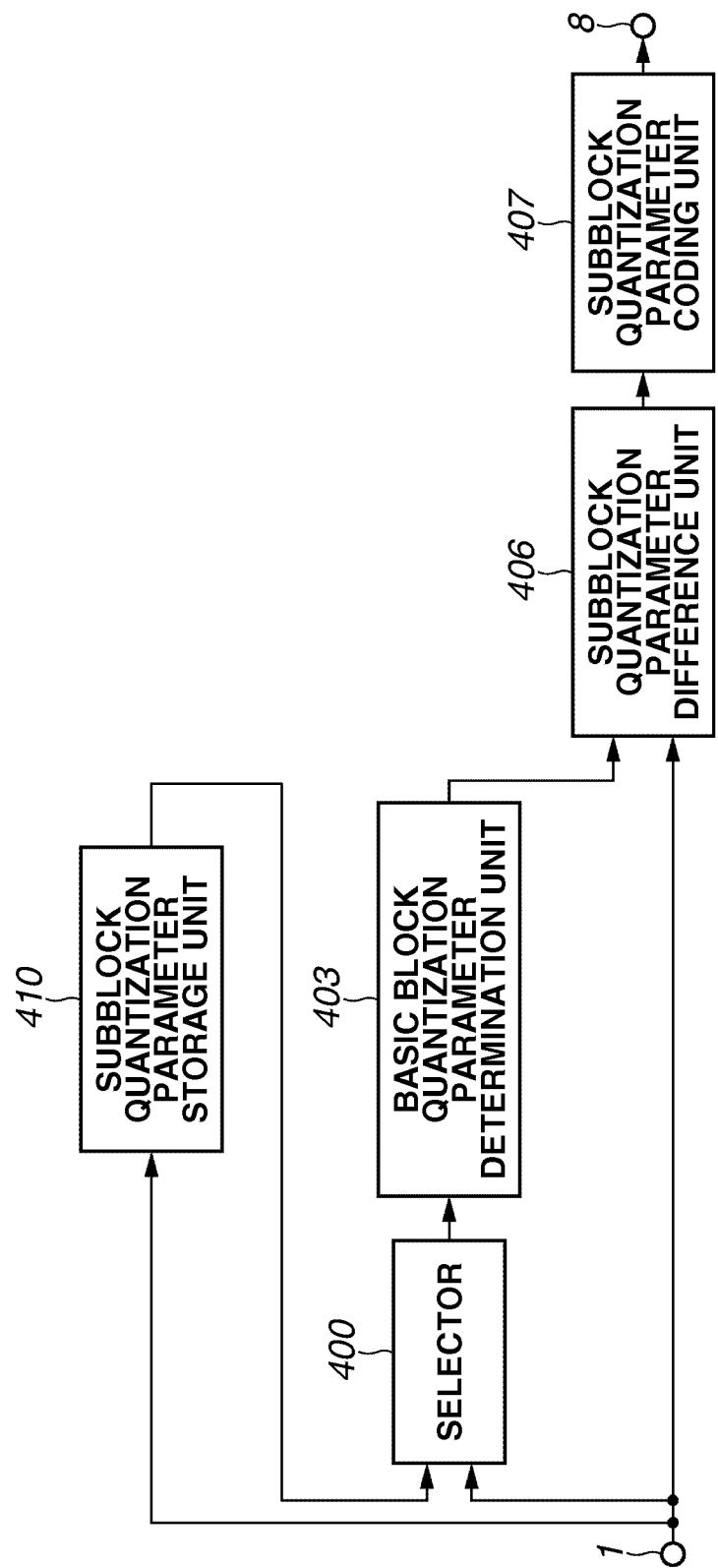
FIG. 16 is a detailed block diagram illustrating a quantization parameter coding unit in an image coding apparatus according to a fifth exemplary embodiment of the present invention.

FIG. 16 is a block diagram illustrating a detailed configuration of the quantization parameter coding unit 1208 according to the fifth exemplary embodiment of the present invention.

Referring to FIG. 16, a selector 400 selects a source depending on the basic block position for the input subblock quantization parameter. A subblock quantization parameter storage unit 410 stores the subblock quantization parameters of the preceding basic block. A basic block quantization parameter determination unit 403 determines a basic block quantization parameter of the basic block subjected to coding based on the subblock quantization parameters stored in the subblock quantization parameter storage unit 410. A subblock quantization parameter difference unit 406 calculates a difference value between the basic block quantization parameter and each subblock quantization parameter. A subblock quantization parameter coding unit 407 encodes the difference value between the first subblock quantization parameter and each subblock quantization parameter.

With the above-mentioned configuration, similar to the third exemplary embodiment, the block division unit 1001 divides image data (input from the terminal 1000) into a plurality of subblocks, and the quantization parameter determination unit 1002 determines each subblock quantization parameter. The quantization parameter determination unit 1002 outputs each determined subblock quantization parameter to the quantization parameter coding unit 1208.

Referring to FIG. 16, when the input subblock quantization parameter is the first subblock quantization parameter in the first basic block of the image data, the selector 400 selects an input from the terminal 1. The basic block quantization parameter determination unit 403 inputs the subblock quantization parameter via the subblock quantization parameter storage unit 410, the subblock quantization parameter difference unit 406, and the selector 400. The subblock quantization parameter storage unit 410 stores the subblock quantization parameter for processing of the following basic block. Similar to the basic block quantization parameter storage unit 203 according to the third exemplary embodiment, the basic block quantization parameter determination unit 403 stores the input subblock quantization parameter as a basic block quantization parameter. Similar to the subblock quantization parameter difference unit 206 according the third exemplary embodiment of the present invention, the subblock quantization parameter difference unit 406 outputs the subblock quantization parameter as it is to the subblock quantization parameter coding unit 407. The subblock quantization parameter coding unit 407 encodes the first subblock quantization parameter through Golomb coding, and outputs the resultant code to the outside via the terminal 8.

Subsequently, the subblock quantization parameter storage unit 410 and the subblock quantization parameter difference unit 406 inputs other subblock quantization parameters of the first basic block of the image data from the terminal 1. The subblock quantization parameter difference unit 406 calculates a difference value between the basic block quantization parameter output from the basic block quantization parameter determination unit 403 and the input subblock quantization parameter. The subblock quantization parameter coding unit 407 inputs the difference value, encodes the difference value similar to the third exemplary embodiment, and outputs the resultant code to the outside via the terminal 8.

Processing for subsequently input basic blocks of the image, not the first basic block, will be described below. Prior to the coding processing for a basic block, the selector 400 selects the subblock quantization parameter storage unit 410 as a source. The basic block quantization parameter determination unit 403 calculates an average of the stored subblock quantization parameters, and considers the average as a basic block quantization parameter. Then, the subblock quantization parameter difference unit 406 inputs the subblock quantization parameters of the relevant basic block from the terminal 1. The subblock quantization parameter difference unit 406 calculates a difference value between the basic block quantization parameter output from the basic block quantization parameter determination unit 403 and each input subblock quantization parameter. The subblock quantization parameter coding unit 407 inputs a difference value, encodes the difference value similar to the third exemplary embodiment, and outputs the resultant code to the terminal 8.

Figure 17:
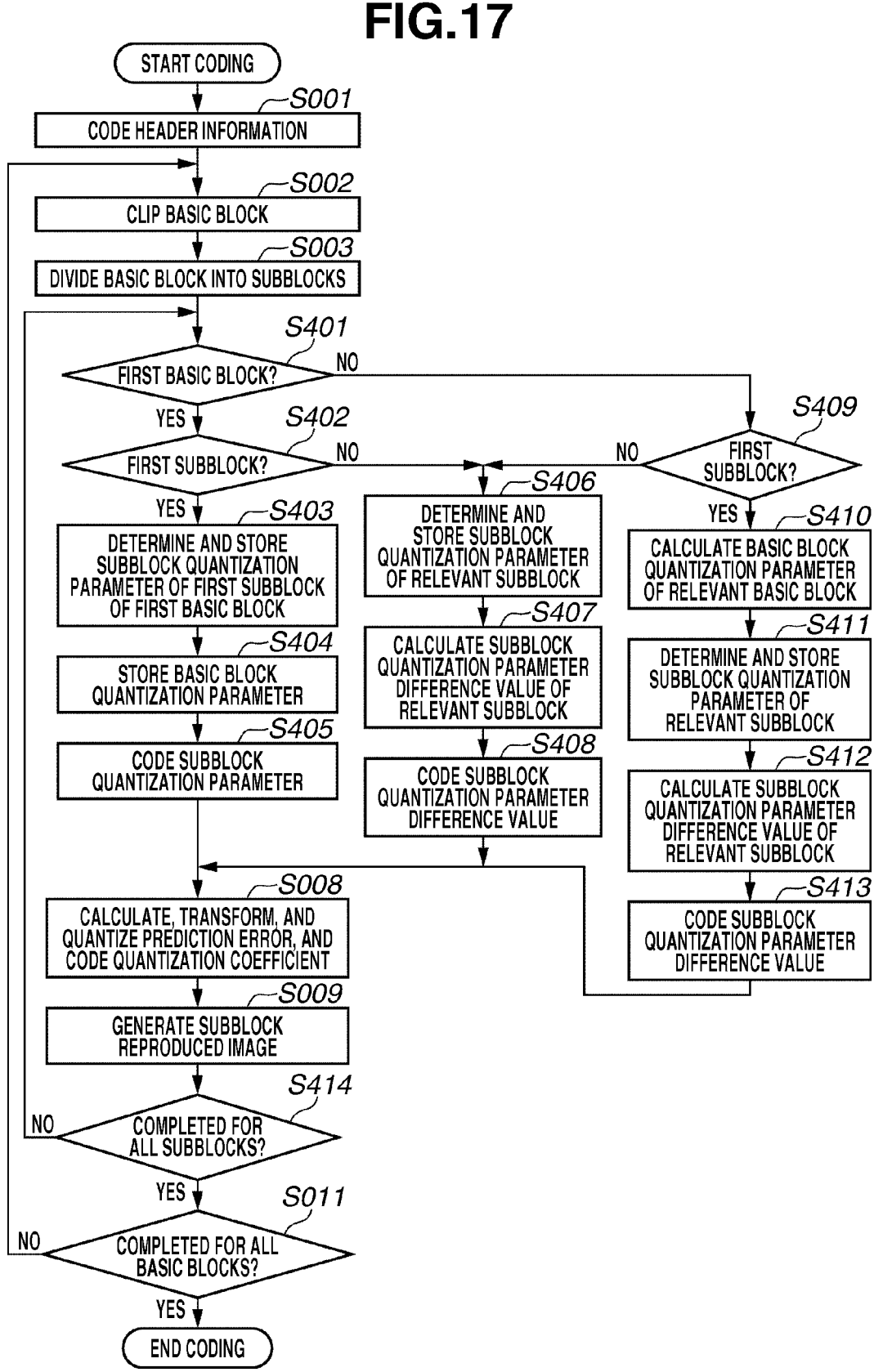
FIG. 17 is a flowchart illustrating image coding processing by the image coding apparatus according to the fifth exemplary embodiment of the present invention.

FIG. 17 is a flowchart illustrating image coding processing by the image coding apparatus according to the fifth exemplary embodiment of the present invention. Referring to FIG. 17, elements having the same function as those in the first exemplary embodiment (FIG. 4) are assigned the same reference numerals and duplicated descriptions will be omitted.

In steps S001 to S003, similar to the image coding apparatus according to the first exemplary embodiment, the image coding apparatus encodes the header information, clips a basic block from image data, and divides the basic block into a plurality of subblocks. In step S401, the image coding apparatus determines whether the relevant basic block is the first basic block of the image. When the relevant basic block is the first basic block (YES in step S401), the processing proceeds to step S402. Otherwise, when the relevant basic block is not the first basic block (NO in step S401), the processing proceeds to step S409. In step S402, the image coding apparatus determines whether the relevant subblock is the first subblock in the first basic block. When the relevant subblock is the first subblock (YES in step S402), the processing proceeds to step S403. Otherwise, when the relevant subblock is not the first subblock (NO in step S402), the processing proceeds to step S406.

In step S403, the image coding apparatus determines a first subblock quantization parameter of the first basic block, and stores the first subblock quantization parameter so as to be referred to during processing of the following basic block. In step S404, the image coding apparatus stores the subblock quantization parameter determined in step S403 as a basic block quantization parameter. In step S405, the image coding apparatus encodes the subblock quantization parameter determined in step S403, and the processing proceeds to step S008. In step S406, the image coding apparatus determine a subblock quantization parameter of the relevant subblock, and stores the determined subblock quantization parameter so as to be referred to during processing of the following basic block.

In step S407, the image coding apparatus subtracts the basic block quantization parameter stored in step S404 from the subblock quantization parameter determined in step S406 to calculate a subblock quantization parameter difference value of the relevant subblock. In step S408, the image coding apparatus encodes the subblock quantization parameter difference value calculated in step S407 to generate quantization parameter difference value coded data, and the processing proceeds to step S008. In step S409, the image coding apparatus determines whether the relevant subblock is the first subblock in the second and subsequent basic block. When the relevant subblock is the first subblock (YES in step S409), the processing proceeds to step S410. Otherwise, when the relevant subblock is not the first subblock (NO in step S409), the processing proceeds to step S406. In step S410, referring to the subblock quantization parameters of the preceding basic block stored in step S403 or S406, the image coding apparatus calculates the basic block quantization parameter of the relevant basic block. In the present exemplary embodiment, the image coding apparatus calculates an average of the above-mentioned subblock quantization parameters, and considers the average as a basic block quantization parameter. In step S411, the image coding apparatus determines a subblock quantization parameter of the relevant subblock, and stores the subblock quantization parameter so as to be referred to during processing of the following basic block.

In step S412, the image coding apparatus subtracts the basic block quantization parameter calculated in step S410 from the subblock quantization parameter determined in step S411 to calculate a subblock quantization parameter difference value of the relevant subblock.

In step S413, the image coding apparatus encodes the subblock quantization parameter difference value calculated in step S412 to generate quantization parameter difference value coded data, and the processing proceeds to step S008. In step S414, the image coding apparatus determines whether coding processing is completed for all the subblocks in the relevant basic block. When coding processing is completed for all the subblocks (YES in step S414), the processing proceeds to step S011. Otherwise, when coding processing is not completed for all the subblocks (NO in step S414), the processing returns to step S401 to process the following subblock. In steps S008, S009, and S011, the image coding apparatus performs similar processing to the first exemplary embodiment to encode the entire image.

With the above-mentioned configuration and operations, determining the basic block quantization parameter by using the subblock quantization parameters of the preceding basic block enables determining the basic block quantization parameter of the relevant basic block immediately after starting the processing of the relevant basic block, resulting in a minimized processing delay. Further, calculating the basic block quantization parameter based on the subblock quantization parameters of the preceding basic block eliminates the need of transferring the basic block quantization parameter, resulting in improved coding efficiency.

The above-mentioned configuration and operations further enable effective parallel processing similar to the first exemplary embodiment of the present invention. Specifically, referring to FIG. 5B, before coding processing, the basic block quantization parameter is calculated based on the subblock quantization parameters of the preceding basic block. This enables calculating the quantization parameter difference values of all subblocks without waiting for completion of processing of each individual subblock.

Although, in the fifth exemplary embodiment, the first subblock quantization parameter is encoded as it is only for the first basic block of the image, the processing is not limited thereto. Specifically, it is also possible to provide a slice-like configuration composed of a plurality of basic blocks, and apply similar processing to the first basic block.

Although, in the fifth exemplary embodiment, the basic block quantization parameter is determined referring to the subblock quantization parameters of the preceding basic block, the processing is not limited thereto. The last subblock quantization parameters of the preceding basic block may be considered as a basic block quantization parameter of the relevant basic block. It is of course possible to refer to the subblock quantization parameters or the basic block quantization parameter of the surrounding basic blocks.

Although, in the fifth exemplary embodiment, an average of subblock quantization parameters of the preceding basic block is considered as a basic block quantization parameter, the processing is not limited thereto. It is of course possible, for example, that the basic block quantization parameter may be a median of subblock quantization parameters, or a most frequent subblock quantization parameter value. It is of course possible to prepare a plurality of calculation methods in this way, select a most efficient basic block quantization parameter, and perform coding by using a code indicating the relevant calculation method.

Although the fifth exemplary embodiment has specifically been described based on frames using intra-prediction, it is apparent that the present exemplary embodiment is also applicable to frames that can use inter-prediction involving motion compensation in prediction.

A sixth exemplary embodiment of the present invention will be described below based on an image decoding method for decoding code data coded by using the coding method according to the fifth exemplary embodiment of the present invention. An image coding apparatus according to the sixth exemplary embodiment has a similar configuration to the image coding apparatus according to the fourth exemplary embodiment of the present invention (FIG. 13), with a difference in the configuration of the quantization parameter decoding unit 1302.

Figure 18:
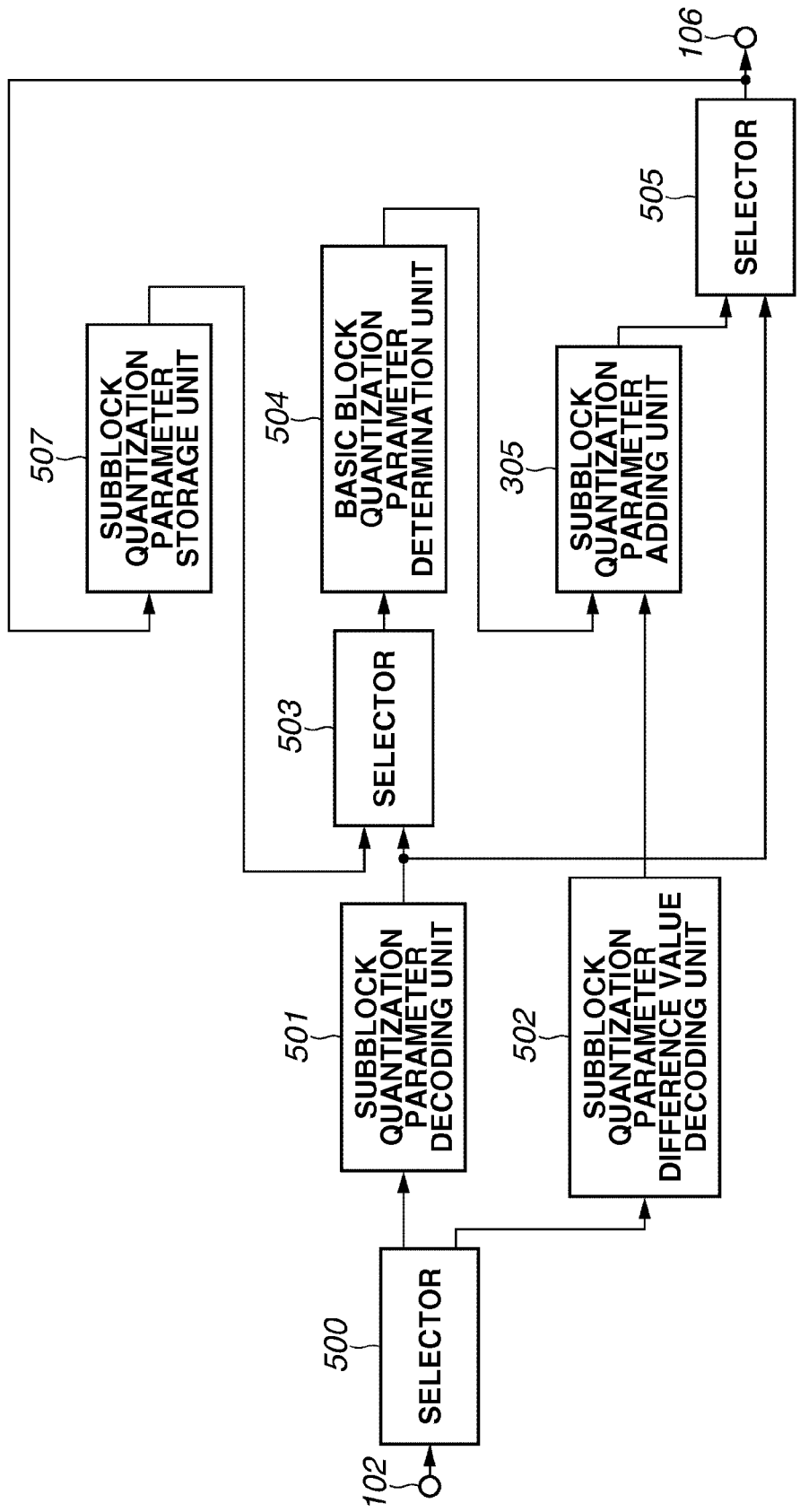
FIG. 18 is a detailed block diagram illustrating a quantization parameter decoding unit in an image decoding apparatus according to a sixth exemplary embodiment of the present invention.

FIG. 18 is a block diagram illustrating a configuration of the quantization parameter decoding unit 1302 according to the sixth exemplary embodiment of the present invention. Referring to FIG. 18, elements having the same function as those in the fourth exemplary embodiment (FIG. 14) are assigned the same reference numerals and duplicated descriptions will be omitted.

A selector 500 selects a destination depending on the subblock position for the input subblock quantization parameter and on the basic block position for the relevant subblock. A subblock quantization parameter decoding unit 501 decodes a code of a subblock quantization parameter itself to reproduce a subblock quantization parameter. A subblock quantization parameter difference value decoding unit 502 decodes a code of a subblock quantization parameter difference value to reproduce a subblock quantization parameter difference value. A selector 503 selects a source depending on the subblock position for the input subblock quantization parameter and on the basic block position for the relevant subblock. A basic block quantization parameter determination unit 504 determines a basic block quantization parameter. A subblock quantization parameter adding unit 505 adds the determined basic block quantization parameter and each subblock quantization parameter difference value to reproduce each subblock quantization parameter. A selector 506 selects a source depending on the subblock position for the input subblock quantization parameter and on the basic block position for the relevant subblock. A subblock quantization parameter storage unit 507 stores the reproduced subblock quantization parameters.

Decoding processing by the image decoding apparatus will be described below. Although, in the present exemplary embodiment, a moving image bit stream is input in frame units, a still image bit stream for one frame may be input.

Prior to the decoding processing of a bit stream for one frame, the selector 500 selects the subblock quantization parameter decoding unit 501 as a destination, and the selector 503 selects the subblock quantization parameter decoding unit 501 as a source. The selector 505 selects the subblock quantization parameter decoding unit 501 as a source.

The subblock quantization parameter decoding unit 501 inputs the subblock quantization parameter coded data of the first basic block via the selector 500. The subblock quantization parameter decoding unit 501 decodes the coded data by using the Golomb code to reproduce a subblock quantization parameter. The basic block quantization parameter determination unit 504 inputs the subblock quantization parameter via the selector 503. Since the subblock of the subblock quantization parameter is the first subblock of the first basic block, the basic block quantization parameter determination unit 504 stores the input subblock quantization parameter as it is as a basic block quantization parameter. The subblock quantization parameter decoding unit 501 outputs the reproduced subblock quantization parameter to the outside via the selector 505 and the terminal 106. The subblock quantization parameter storage unit 507 stores the subblock quantization parameter.

Subsequently, the selector 500 selects the subblock quantization parameter difference value decoding unit 502 as a destination, and the selector 503 selects the subblock quantization parameter storage unit 507 as a source. The selector 505 selects the subblock quantization parameter adding unit 305 as a source.

When the quantization parameter decoding unit 1302 inputs the subblock quantization parameter difference value coded data of the following subblock, the subblock quantization parameter difference value decoding unit 502 inputs the subblock quantization parameter difference value coded data via the selector 500. The subblock quantization parameter difference value decoding unit 502 decodes the subblock quantization parameter difference value coded data to reproduce a subblock quantization parameter difference value. The subblock quantization parameter adding unit 305 adds the subblock quantization parameter difference value to the basic block quantization parameter to reproduce a subblock quantization parameter, and outputs the reproduced subblock quantization parameter to the outside via the terminal 106. The subblock quantization parameter storage unit 507 stores the subblock quantization parameter.

Subsequently, the quantization parameter decoding unit 1302 inputs the subblock quantization parameter difference value coded data of the following basic block. In this case, the basic block quantization parameter determination unit 504 reads the subblock quantization parameters of the preceding basic block from the subblock quantization parameter storage unit 507, calculates an average of the read subblock quantization parameters, and considers the average as a basic block quantization parameter of the relevant basic block.

The subblock quantization parameter difference value decoding unit 502 decodes the input subblock quantization parameter difference value coded data to reproduce a subblock quantization parameter difference value. The subblock quantization parameter adding unit 305 reproduces a subblock quantization parameter, and outputs the reproduced subblock quantization parameter to the outside via the terminal 106. The subblock quantization parameter storage unit 507 stores the reproduced subblock quantization parameter.

Subsequently, the quantization parameter decoding unit 1302 inputs following subblock quantization parameter difference value coded data, similarly reproduces a subblock quantization parameter difference value, and then reproduces a subblock quantization parameter, the quantization parameter decoding unit 1302 outputs the reproduced subblock quantization parameter to the outside via the terminal 106. The subblock quantization parameter storage unit 507 stores the subblock quantization parameter.

Figure 19:
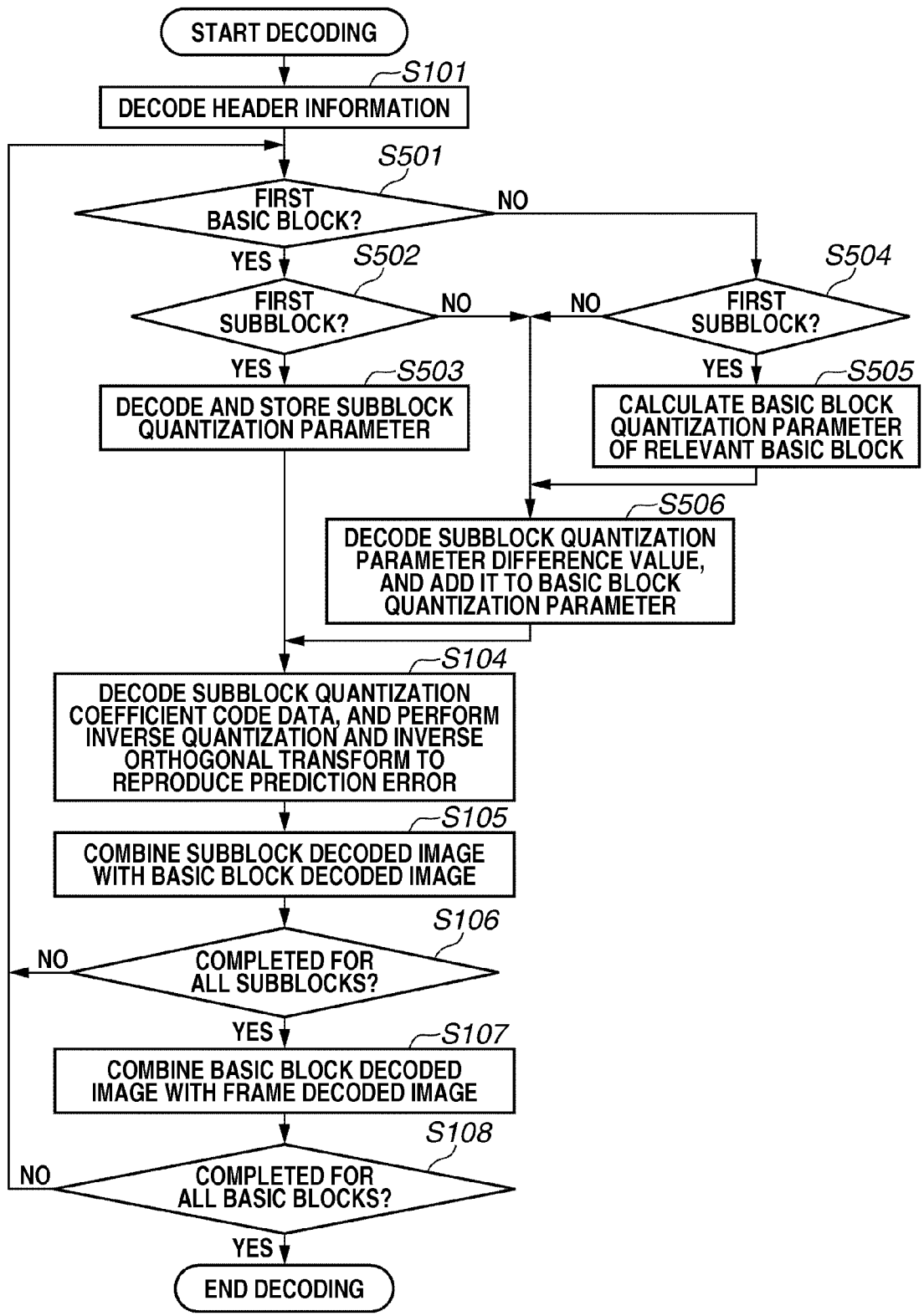
FIG. 19 is a flowchart illustrating image decoding processing by the image decoding apparatus according to the sixth exemplary embodiment of the present invention.

FIG. 19 is a flowchart illustrating image decoding processing by an image decoding apparatus according to the sixth exemplary embodiment of the present invention.

In step S101, similar to the second exemplary embodiment of the present invention, the image decoding apparatus decodes the header information. In step S501, the image decoding apparatus determines whether the basic block of the subblock subjected to decoding is the first basic block of the image. When the relevant basic block is the first basic block (YES in step S501), the processing proceeds to step S502. Otherwise, when the relevant basic block is not the first basic block (NO in step S501), the processing proceeds to step S504.

In step S502, the image decoding apparatus determines whether the subblock subjected to decoding is the first subblock in the basic block. When the relevant subblock is the first subblock block (YES in step S502), the processing proceeds to step S503. Otherwise, when the relevant subblock is not the first subblock block (NO in step S502), the processing proceeds to step S506. In step S503, the image decoding apparatus decodes the code related to the input subblock quantization parameter, i.e., the subblock quantization parameter coded data by using the Golomb code to reproduce a subblock quantization parameter. The image decoding apparatus stores the resultant code as a basic block quantization parameter. At the same time, the image decoding apparatus separately stores the resultant code so as to be referred to during determination of the basic block quantization parameter of the following basic block. Then, the processing proceeds to step S104 for decoded image generation of the first subblock.

In step S504, the image decoding apparatus determines whether the subblock subjected to decoding is the first subblock in the basic block. When the subblock subjected to decoding is the first subblock (YES in step S504), the processing proceeds to step S505. Otherwise, when the subblock subjected to decoding is not the first subblock (NO in step S504), the processing proceeds to step S506.

In step S505, the image decoding apparatus calculates an average of the stored subblock quantization parameters of the preceding basic block, and considers the average as a basic block quantization parameter. Then, the processing proceeds to step S506.

In step S506, the image decoding apparatus decodes the code related to the input subblock quantization parameter, i.e., the subblock quantization parameter difference value coded data by using the Golomb code to reproduce a subblock quantization parameter difference value. The image decoding apparatus adds the reproduced subblock quantization parameter difference value to the basic block quantization parameter stored or calculated in step S503 or S505 to obtain a subblock quantization parameter. Then, the processing proceeds to step S104 for decoded image generation of the subblock. Subsequently, similar to the fourth exemplary embodiment of the present invention, the image decoding apparatus generates a subblock decoded image and reproduces a frame image.

The above-mentioned configuration and operations enable decoding a bit stream with which the basic block quantization parameter value generated by the image coding apparatus according to the fifth exemplary embodiment is not coded.

The above-mentioned configuration and operations further enable effective parallel processing similar to the second exemplary embodiment of the present invention. Specifically, referring to FIG. 9B, instead of the basic block quantization parameter decoding, the processor A performs the basic block quantization parameter calculation by using subblock quantization parameters of the preceding basic block. This enables the processor A to start the quantization parameter reproduction for all the subblocks without waiting for completion of processing on other subblocks.

Although, in the sixth exemplary embodiment, an average of subblock quantization parameters of the preceding basic block is considered as a basic block quantization parameter, the processing is not limited thereto as long as the method for calculating the basic block quantization parameter according to the fifth exemplary embodiment is used. It is of course possible, for example, that the basic block quantization parameter may be a median of subblock quantization parameters, or a most frequent subblock quantization parameter value. These pieces of information can be derived from the subblock quantization parameters stored in the subblock quantization parameter storage unit 507.

Even when a plurality of calculation methods is prepared in this way on the coding side, a most efficient basic block quantization parameter is selected, and coding is performed based on a code indicating the relevant calculation method, the subblock quantization parameter can be similarly calculated through decoding.

Although the sixth exemplary embodiment has specifically been described based on frames using intra-prediction, it is apparent that the present exemplary embodiment is also applicable to frames that can use inter-prediction involving motion compensation in prediction.

Although the above-mentioned exemplary embodiments have specifically been described on the premise that the processing units illustrated in FIGS. 1, 3, 6, 7, 10, 11, 13, 14, 16, and 18 are implemented by hardware, processing executed by these processing units may be implemented by software (computer programs).

Figure 20:
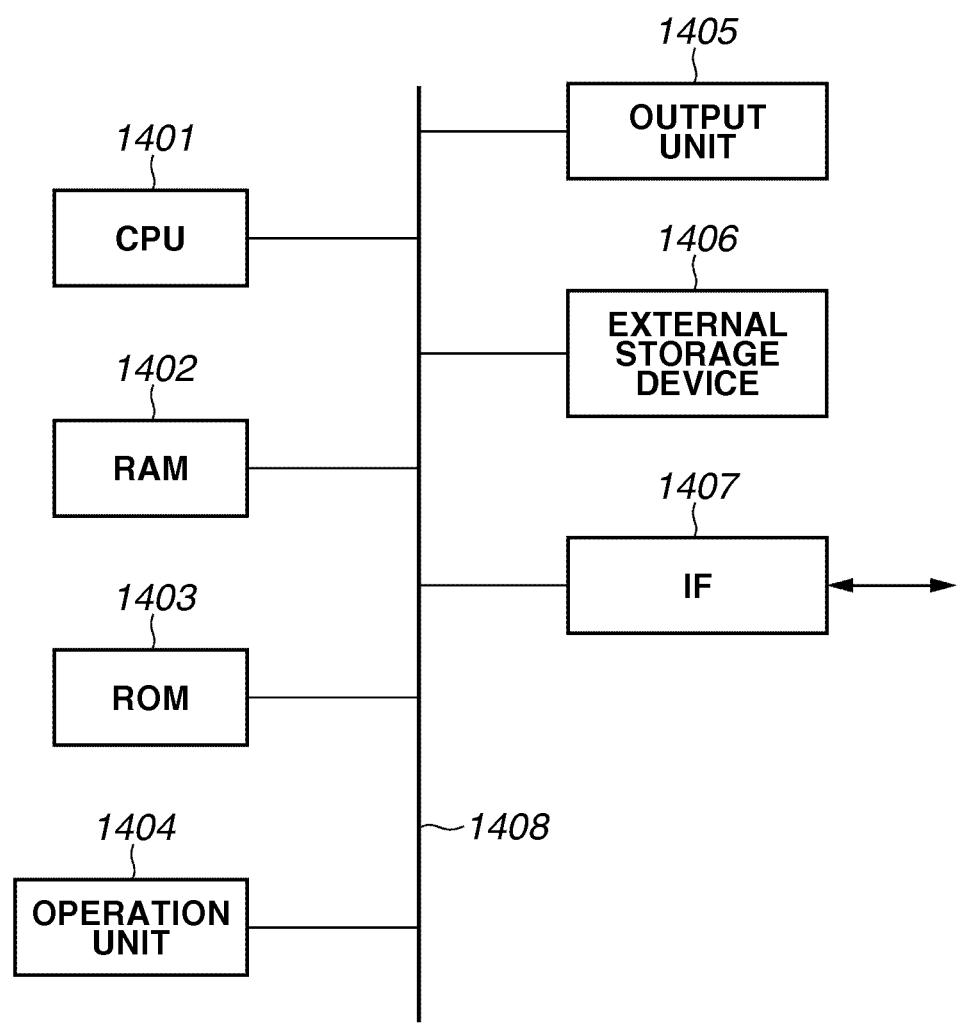
FIG. 20 is a block diagram illustrating an example hardware configuration of a computer applicable to the image coding apparatus and the image decoding apparatus according to the exemplary embodiments of the present invention.

FIG. 20 is a block diagram illustrating an example hardware configuration of a computer applicable to the image display unit according to the above-mentioned exemplary embodiments of the present invention.

A central processing unit (CPU) 1401 controls the entire computer by using computer programs and data stored in a random access memory (RAM) 1402 and a read-only memory (ROM) 1403, and executes each piece of processing described above as the image processing apparatus according to the above-mentioned exemplary embodiments. Specifically, the CPU 1401 functions as the processing units illustrated in FIGS. 1, 3, 6, 7, 10, 11, 13, 14, 16, and 18.

The RAM 1402 includes an area for temporarily storing a computer program and data loaded from an external storage device 1406, and data acquired from the external via an interface (I/F) 1407. The RAM 1402 further includes work areas used by the CPU 1401 to execute various pieces of processing. For example, the RAM 1402 can be used as a frame memory and other various types of areas as required.

The ROM 1403 stores setting data and a boot program of the computer. An operation unit 1404 is provided with a keyboard, a mouse, etc. A user of the computer operates the operation unit 1404 to give various instructions to the CPU 1401. An output unit 1405 displays a result of processing executed by the CPU 1401. The output unit 1405 is composed of a hold-type display unit such as a liquid crystal display (LCD) or an impulse-type display unit such as a field emission type display unit.

The external storage device 1406 is a mass storage device represented by a hard disk drive unit. The external storage device 1406 stores an operating system (OS) and computer programs executed by the CPU 1401 to implement the functions of the processing units illustrated in FIGS. 1, 3, 6, 7, 10, 11, 13, 14, 16, and 18. The external storage device 1406 may further store image data to be processed.

The CPU 1401 suitably loads a computer program and data stored in the external storage device 1406 into the RAM 1402, and executes the computer program. Networks such as a local area network (LAN) and the Internet, a projection device, a display device, and other devices can be connected to the I/F 1407. The computer can acquire and transmit various pieces of information via the I/F 1407. A bus 1408 interconnects the above-mentioned various devices.

Operations with the above-mentioned configuration are achieved when the CPU 1401 controls the processing of the above-mentioned flowcharts.

Further, when the CPU 1401 has a multi-core configuration, efficient parallel processing can be achieved by assigning a thread of each piece of processing to each core.

The present invention is also achieved when a storage medium recording computer program codes for implementing the above-mentioned functions is supplied to a system, and the system loads and executes the computer program codes. In this case, the computer program codes loaded from the storage medium implement the functions of the exemplary embodiments, and the storage medium storing the computer program codes constitutes the present invention. Further, the present invention further includes a case where the operating system (OS) operating on the computer executes a part or whole of actual processing based on instructions of the computer program codes, and the above-mentioned functions are implemented by the processing of the computer program codes.

Further, the present invention may be achieved by the following form. Specifically, the present invention further includes a case where computer program codes loaded from the storage medium are written to a memory provided in a function expansion card inserted into the computer or a function expansion unit connected to the computer. The present invention further includes a case where a CPU provided in the function expansion card or function expansion unit executes a part or whole of actual processing based on instructions of the computer program codes to implement the above-mentioned functions.

When applying the present invention to the above-mentioned storage medium, the storage medium stores the computer program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image coding apparatus comprising:
a division unit configured to divide an input image into a plurality of blocks, at least one of the blocks being divided into subblocks so as to form a quadtree;
a decision unit configured to decide respective quantization parameters of the subblocks;
an acquisition unit configured to acquire a first difference value between a first quantization parameter of a first subblock of the subblocks and a second quantization parameter of a second subblock of the subblocks, the first subblock to be coded before the second subblock, and to acquire a second difference value between a third quantization parameter of a third subblock of the subblocks and a value corresponding to an average of quantization parameters of subblocks which are to be coded before the third subblock; and
a coding unit configured to code the first difference value and the second difference value.

2. The apparatus according to claim 1, wherein the first subblock is arranged at the upper left of the block.

3. The apparatus according to claim 1, wherein the value corresponding to the average is an approximate value of the average or a value of the average.

4. An image decoding apparatus for decoding quantization parameters for subblocks in a block representing a part of an image, wherein the block is divided into subblocks so as to form a quadtree, the image decoding apparatus comprising:
a decoding unit configured to decode a first quantization parameter for a first subblock, coded data related to a first difference value between the first quantization parameter for the first subblock and a second quantization parameter for a second subblock, and coded data related to a second difference value between a third quantization parameter for a third subblock and a value corresponding to an average of quantization parameters for subblocks in the block, wherein the first subblock, the second subblock, and the third subblock are generated by dividing the block so as to form a quadtree;
an acquisition unit configured to acquire the second quantization parameter based on the first quantization parameter and the first difference value decoded by the decoding unit, and acquire the third quantization parameter based on the second difference value decoded by the decoding unit and the value corresponding to the average of quantization parameters for subblocks decoded before the third subblock.

5. The apparatus according to claim 4, wherein the first subblock is arranged at the upper left of the block.

6. The apparatus according to claim 4, wherein the value corresponding to the average is an approximate value of the average or a value of the average.

7. A method for an image coding apparatus, the method comprising:
dividing an input image into a plurality of blocks, at least one of the blocks being divided into subblocks so as to form a quadtree;
deciding respective quantization parameters of the subblocks;
acquiring a first difference value between a first quantization parameter of a first subblock of the subblocks and a second quantization parameter of a second subblock of the subblocks, the first subblock to be coded before the second subblock, and acquiring a second difference value between a third quantization parameter of a third subblock of the subblocks and a value corresponding to an average of quantization parameters of subblocks which are to be coded before the third subblock; and
coding the first difference value and the second difference value.

8. The method according to claim 7, wherein the first subblock is arranged at the upper left of the block.

9. The method according to claim 7, wherein the value corresponding to the average is an approximate value of the average or a value of the average.

10. A method for an image decoding apparatus for decoding quantization parameters for subblocks in a block representing a part of an image, wherein the block is divided into subblocks so as to form a quadtree, the method comprising:
decoding a first quantization parameter for a first subblock, coded data related to a first difference value between the first quantization parameter for the first subblock and a second quantization parameter for a second subblock, and coded data related to a second difference value between a third quantization parameter for a third subblock and a value corresponding to an average of quantization parameters for subblocks in the block, wherein the first subblock, the second subblock, and the third subblock are generated by dividing the block so as to form a quadtree;
acquiring the second quantization parameter based on the first quantization parameter and the first difference value decoded by the decoding, and acquiring the third quantization parameter based on the second difference value decoded by the decoding and the value corresponding to the average of quantization parameters for subblocks decoded before the third subblock.

11. The method according to claim 10, wherein the first subblock is arranged at the upper left of the block.

12. The method according to claim 10, wherein the value corresponding to the average is an approximate value of the average or a value of the average.

13. A non-transitory computer readable storage medium for storing instructions that, when executed, cause an image coding apparatus to perform a process, the process comprising:

dividing an input image into a plurality of blocks, at least one of the blocks being divided into subblocks so as to form a quadtree;

deciding respective quantization parameters of the subblocks;

acquiring a first difference value between a first quantization parameter of a first subblock of the subblocks and a second quantization parameter of a second subblock of the subblocks, the first subblock to be coded before the second subblock, and acquiring a second difference value between a third quantization parameter of a third subblock of the subblocks and a value corresponding to an average of quantization parameters of subblocks which are to be coded before the third subblock; and coding the first difference value and the second difference value.

14. The non-transitory computer readable storage medium according to claim 13, wherein the first subblock is arranged at the upper left of the block.

15. The non-transitory computer readable storage medium according to claim 13, wherein the value corresponding to the average is an approximate value of the average or a value of the average.

16. A non-transitory computer readable storage medium for storing instructions that, when executed, cause an image decoding apparatus to perform a process, wherein the image decoding apparatus decodes quantization parameters for subblocks in a block representing a part of an image, the block divided into subblocks so as to form a quadtree, the process comprising:

decoding a first quantization parameter for a first subblock, coded data related to a first difference value between the first quantization parameter for the first subblock and a second quantization parameter for a second subblock, and coded data related to a second difference value between a third quantization parameter for a third subblock and a value corresponding to an average of quantization parameters for subblocks in the block, wherein the first subblock, the second subblock, and the third subblock are generated by dividing the block so as to form a quadtree;

acquiring the second quantization parameter based on the first quantization parameter and the first difference value decoded by the decoding, and acquiring the third quantization parameter based on the second difference value decoded by the decoding and the value corresponding to the average of quantization parameters for subblocks decoded before the third subblock.

17. The non-transitory computer readable storage medium according to claim 16, wherein the first subblock is arranged at the upper left of the block.

18. The non-transitory computer readable storage medium according to claim 16, wherein the value corresponding to the average is an approximate value of the average or a value of the average.

* * * * *